US009804684B2

(12) United States Patent
Kitahama et al.

(10) Patent No.: US 9,804,684 B2
(45) Date of Patent: Oct. 31, 2017

(54) INFORMATION INPUTTING APPARATUS, INFORMATION PROVIDING APPARATUS, AND INFORMATION PROVIDING SYSTEM PROVIDED WITH THESE APPARATUSES

(75) Inventors: Kenichi Kitahama, Toyota (JP); Masato Endo, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 113 days.

(21) Appl. No.: 14/362,311

(22) PCT Filed: Dec. 2, 2011

(86) PCT No.: PCT/JP2011/077946
§ 371 (c)(1),
(2), (4) Date: Jun. 19, 2014

(87) PCT Pub. No.: WO2013/080375
PCT Pub. Date: Jun. 6, 2013

(65) Prior Publication Data
US 2014/0337546 A1 Nov. 13, 2014

(51) Int. Cl.
*G06F 13/12* (2006.01)
*G06F 3/02* (2006.01)
(Continued)

(52) U.S. Cl.
CPC ............... *G06F 3/02* (2013.01); *B60K 37/06* (2013.01); *G06Q 50/01* (2013.01); *G06Q 50/30* (2013.01);
(Continued)

(58) Field of Classification Search
CPC .................................. G06Q 30/00; G01C 21/00
(Continued)

(56) References Cited

U.S. PATENT DOCUMENTS 6,330,499 B1 * 12/2001 Chou .................... G07C 5/008
701/31.4
6,373,472 B1 * 4/2002 Palalau .................. B60K 37/02
345/156

(Continued)

FOREIGN PATENT DOCUMENTS

JP 2008-58039 A 3/2008
JP 2009-521752 A 6/2009
(Continued)

*Primary Examiner* — Titus Wong
(74) *Attorney, Agent, or Firm* — Oblon, McClelland, Maier & Neustadt, L.L.P.

(57) ABSTRACT

A vehicle is provided with a button that is depressed by a driver at any time for inputting intention information indicating an intention of approving a condition or an intention of rejecting the condition. The intention information inputted by the depressing operation of the button is transmitted to an information providing center. The intention information is transmitted together with position information indicating a point where the button is depressed and time information indicating a time. In the center, a server provides related information related to the transmitted intention information as a feedback. The server also supposes the reason why the transmitted intention information is inputted, and transmits the supposed reason to a closed SNS or an open SNS with a response form. The server then determines a reason of input based upon a response in accordance with the response form, and accumulates the determined reason in an information storage section so as to be retrievable in association with the intention information.

35 Claims, 14 Drawing Sheets

(51) Int. Cl.
  *G06Q 50/00*   (2012.01)
  *G06Q 50/30*   (2012.01)
  *H04L 12/58*   (2006.01)
  *B60K 37/06*   (2006.01)

(52) U.S. Cl.
  CPC ........ *H04L 51/32* (2013.01); *B60K 2350/928* (2013.01)

(58) Field of Classification Search
  USPC .......................................................... 710/73
  See application file for complete search history.

(56) References Cited

U.S. PATENT DOCUMENTS

| | | | | |
|---|---|---|---|---|
| 6,502,030 B2* | 12/2002 | Hilleary | .................. | B60R 25/33 340/992 |
| 6,757,593 B2* | 6/2004 | Mori | .................. | B60R 16/0231 700/19 |
| 7,126,583 B1* | 10/2006 | Breed | .................... | B60K 35/00 345/158 |
| 8,209,118 B2* | 6/2012 | Chang | .................... | G06Q 10/08 701/400 |
| 2004/0044472 A1* | 3/2004 | Tsuge | ................. | G01C 21/3492 701/414 |
| 2009/0254241 A1 | 10/2009 | Basir | | |
| 2010/0299207 A1* | 11/2010 | Harlev | ................... | G06Q 30/02 705/14.62 |

FOREIGN PATENT DOCUMENTS

| | | |
|---|---|---|
| JP | 2010-500649 A | 1/2010 |
| JP | 2010-54484 A | 3/2010 |
| JP | 2010-108861 A | 5/2010 |
| JP | 2010-528366 A | 8/2010 |
| JP | 2011-173449 A | 9/2011 |
| JP | 2011-192180 A | 9/2011 |
| WO | WO 2007/076150 A2 | 7/2007 |
| WO | WO 2008/021098 A2 | 2/2008 |
| WO | WO 2008/147564 A1 | 12/2008 |

* cited by examiner

| Coordinate | Time | Type | Intention | Number of times | Reason | Reason (supposed) |
|---|---|---|---|---|---|---|
| (100,150) | 7:00~7:30 | Any | Like | 100 | Easy to run | |
| | 8:00~9:00 | Any | Dislike | 250 | Many traffic jams | |
| | 19:00~19:30 | Any | Dislike | 200 | Unclear | Many traffic jams |

FIG.14

Around XX station (coordinate: N a1:a2:a3, E b1:b2:b3)

| | Date | User account | Type | Number of times | Supposed reason (personal) | Response (personal) | Comment |
|---|---|---|---|---|---|---|---|
| "Like"<br>Supposed reason (whole)<br>A4(◎◎◎◎)<br>Response (whole)<br>B1(......) | 20**/M/D | abcd123 | XYZ | 3 | A3 | A2 | Sightseeing spot |
| | | | | | | | |
| | | | | | | | |
| | | | | | | | |
| "Dislike"<br>Supposed reason (whole)<br>A5(× × × ×)<br>Response (whole)<br>B2(△△△△) | | | | | | | |
| | | | | | | | |
| | | | | | | | |
| | | | | | | | |

INFORMATION INPUTTING APPARATUS, INFORMATION PROVIDING APPARATUS, AND INFORMATION PROVIDING SYSTEM PROVIDED WITH THESE APPARATUSES

TECHNICAL FIELD

The present invention relates to an information inputting apparatus provided in a compartment of a vehicle for inputting information, an information providing apparatus that externally collects information and provides various pieces of information, and an information providing system including these apparatuses.

BACKGROUND ART

Conventionally, a user carrying an information terminal apparatus has widely posted his/her opinion or impression to a presented subject through a Web such as a social networking service (SNS) by operating his/her information terminal apparatus, as described in patent documents 1 to 4 described below, for example.

Conventionally, as an input unit provided to a vehicle, switches provided on a steering wheel for controlling an on-vehicle device have widely been known as described in patent documents 5 and 6 described below, for example.

PRIOR ART DOCUMENT

Patent Document

Patent Document 1: Japanese Patent Application Laid-Open (kokai) No. 2009-521752
Patent Document 2: Japanese Patent Application Laid-Open (kokai) No. 2010-528366
Patent Document 3: Japanese Patent Application Laid-Open (kokai) No. 2010-500649
Patent Document 4: Japanese Patent Application Laid-Open (kokai) No. 2011-192180
Patent Document 5: Japanese Patent Application Laid-Open (kokai) No. 2011-173449
Patent Document 6: Japanese Patent Application Laid-Open (kokai) No. 2010-108861

SUMMARY OF THE INVENTION

A vehicle can freely move. Therefore, an occupant who is aboard the vehicle and moves with the vehicle has a subjective opinion or impression for a surrounding ever-changing condition. Specifically, a driver driving a vehicle might have a feeling of "good" in a case where the driver can exhilaratingly drive the vehicle on a curve or in a case where the driver can drive the vehicle to a destination without running into a traffic jam. On the contrary, the driver might have a feeling of "not good" for an uneven surface of a road, or have a feeling of "not good" in a case where the driver cannot find a parking lot in an outing destination.

However, an input unit requiring a complicated operation is not provided in a compartment of a vehicle, particularly around a driver's seat, in order to prevent any troubles from occurring upon driving a vehicle. Therefore, in order to transmit the subjective opinion or feeling described above, an occupant carrying an information terminal apparatus generally operates his/her information terminal apparatus to transmit his/her subjective opinion or feeling through a Web such as SNS. This has been conventionally done. When a driver drives a vehicle, he/she cannot operate his/her information terminal apparatus. Therefore, the driver has to park the vehicle in order to transmit his/her subjective opinion or feeling. It is difficult to transmit from the vehicle, in real time, the subjective opinion or feeling, i.e., an intention (including an intuitive realization that might be forgotten when an occupant looks back later) of an occupant, for a condition that is involved with the occupant aboard the vehicle and that varies from hour to hour with the moving vehicle. It is also troublesome to operate the information terminal apparatus for the things past. Therefore, the intention of the occupant described above is difficult to be transmitted to the outside so far.

The occupant' intention, particularly a real-time intention for an ever-changing condition, possibly includes the occupant's honest feeling or opinion. When intention information indicating such intention is widely collected, information obtained from the collected intention information becomes an information source for providing useful information to the occupant. With this, a car life shared by occupants is enhanced, or such information can be useful information for developing better towns or products for a society or a company.

Accordingly, it is effective that a driver driving a vehicle can input his/her intention in real time in order to widely and efficiently collect intention information of an occupant described above. However, in this case, it is of course significant that the driver can easily input his/her intention without causing any troubles on driving the vehicle. For this, it has to be configured such that the driver can input his/her intention with a very simplified operation system, for example, different from a configuration in which the driver operates the information terminal apparatus.

On the other hand, when the operation system is simplified as described above, an amount of intention information tends to be decreased. Accordingly, in order to widely collect a lot of small intention information pieces and provide useful information, missing information (lacked information) has to be appropriately supplemented. An input operation might be boring, because the operation system is simplified, so that intention information might not continuously be inputted. In order to widely collect a lot of small intention information pieces and provide useful information, it is necessary that an occupant (particularly, a driver) can continuously input his/her intention without getting bored.

The present invention is accomplished in order to solve the foregoing problem, and aims to provide an information inputting apparatus, an information providing apparatus, and an information providing system including these apparatuses, which can provide useful information by widely collecting small information pieces.

In order to attain the object described above, according to an aspect of the present invention, the present invention provides an information inputting apparatus including an input unit, which is provided in a compartment of a vehicle and inputted by an occupant of the vehicle, wherein the input unit is used by the occupant to input intention information indicating at least an intention of approving a condition involved with the occupant aboard the vehicle and an intention of rejecting the condition. In this case, the condition involved with the occupant aboard the vehicle is a condition involved with the occupant aboard the vehicle in a real space. In this case, the occupant is at least a driver of the vehicle, and the input unit can be provided at least on a position near a steering wheel operated by the driver. For example, the input unit can be provided at a position where the driver can make an input operation while gripping the steering wheel. In this case, the input unit can be at least any one of a button depressed by the occupant, a voice input unit to which a voice of the occupant is inputted, and an image recognition unit that recognizes an expression of a face of the occupant as an image.

According to these configurations, the occupant aboard the vehicle can input an intention (feeling good, satisfying, making it OK) of approving a condition in a real space involved with the occupant aboard the vehicle, e.g., an ever-changing condition as the vehicle is moving or even when the vehicle stops (e.g., a surrounding condition, a road condition, a driving condition of the vehicle, or a health condition of the occupant) or an intention (feels not good, dissatisfying, or making it NO) of rejecting such condition, in other words, a minimum of small information (digital information) indicating an approval or rejection, at any time with a very simplified input system (depressing operation of a button, voice input, or image recognition) without any loads. In a case where the input unit is a button provided on a steering wheel and depressed by a driver, in particular, the driver can very easily, i.e., without any loads, input the intention of approving or rejecting the ever-changing condition only by depressing the button while gripping the steering wheel, even when the driver drives the vehicle.

Different from the case where the occupant indicates an intention (makes an opinion) to a subject presented by other person as is conventionally done popularly, the occupant can voluntarily input and show the intention to various conditions (specifically, a surrounding condition that is a condition in a real space where the occupant is in, a road condition, a vehicle driving condition, or a health condition of the occupant). Specifically, the occupant does not only indicate the intention or follow a stereotypical condition, but can voluntarily transmit the intention of approving or rejecting various conditions described above in addition to the following. Thus, the intention information inputted by the occupant via the input unit becomes basically diversity-carrying information.

In these cases, the input unit is connected to an on-vehicle device, which can be mounted on the vehicle, so as to be capable of making communication, and the input unit can supply the intention information to the on-vehicle device according to an input operation by the occupant. In this case, the on-vehicle device that can be mounted on the vehicle includes a communication unit communicating with an outside of the vehicle, and transmits the intention information, which is supplied according to the operation on the input unit by the occupant, to the outside. The communication unit in the on-vehicle device can transmit at least one of identification information for identifying the vehicle and identification information for identifying the occupant to the outside in association with the intention information, when the occupant inputs the intention information via the input unit. More specifically, in this case, the communication unit in the on-vehicle device communicates with the outside by logging in to a predetermined network service, and the communication unit transmits the identification information for identifying the occupant to the outside in association with the intention information, when logged in the predetermined network service.

According to these configurations, the intention information inputted by the occupant via the input unit can be supplied to the on-vehicle device mounted on the vehicle (including, for example, a device that can detachably be mounted on the vehicle and that is not necessarily mounted on the vehicle at all times, such as a detachable navigation apparatus, a cellular phone, or a smartphone, which can be carried by the occupant aboard the vehicle). Thus, the configuration of the input unit can be simplified, whereby cost can be reduced. As a result, a vehicle having mounted thereto an information inputting apparatus can be popularized widely. The inputted intention information can be transmitted and outputted to the outside in real time via the communication unit provided in the on-vehicle device to which the input unit is connected. Accordingly, even when the driver drives the vehicle, the driver can transmit the intention information to the outside. Upon transmitting the intention information to the outside, the driver can transmit at least one of the identification information for identifying a vehicle and identification information for identifying an occupant in association with the intention information. Accordingly, when the driver logs in to a predetermined network service, including a network service providing information only for members or a predetermined social networking service (SNS), to transmit the intention information to the outside, the process of logging in to the network service every time the occupant transmits the intention information can be skipped. Accordingly, the occupant can easily transmit the intention information to the outside.

In this case, the communication unit in the on-vehicle device can transmit condition information, which is related to the condition involved with the occupant aboard the vehicle, to the outside in association with the intention information, when the occupant inputs the intention information via the input unit. Specifically, in this case, the condition information can be at least one of current position information indicating a current position of the vehicle when the occupant inputs the intention information via the input unit and time information indicating a time when the occupant inputs the intention information.

According to these configurations, at least one of the position information and the time information can be transmitted to the outside with the intention information as the condition information indicating the condition when the occupant inputs the intention information. Thus, the condition information, i.e., the position information and/or the time information, can effectively be used upon specifying the diversity-carrying intention information as described above.

Another feature of the present invention is that the information inputting apparatus includes a notification unit that acquires related information related to an input of the intention information by the occupant via the input unit from the outside via the communication unit in the on-vehicle device, and notifies the occupant of the acquired related information.

According to this configuration, when the occupant inputs the intention information by using the input unit, related information related to the input is fed back. The fed back related information is notified to the occupant via the notification unit. Therefore, when inputting the intention information, the occupant can obtain appropriate and useful information as the feedback, whereby the occupant can continuously input the intention information without getting bored even by inputting the intention information via the simplified input unit. Since the occupant can obtain appropriate feedback, the occupant aboard the vehicle can really feel that he/she connects the outside.

In this case, the related information can be based upon intention information inputted by an occupant of other vehicle for the condition when the occupant inputs the intention information via the input unit. Specifically, the related information can be information related to a number of intention information pieces inputted by the occupant of the other vehicle, or information related to the intention information inputted by the occupant of the other vehicle. In these cases, the related information can be acquired from the outside through a predetermined network service that can be used by the occupant.

According to these configurations, the occupant can obtain information related to the number of intention information pieces inputted by the occupant of other vehicle under the similar condition or information that the occupant does not know but that is recognized by the occupant of other vehicle, as the related information by the feedback. In this case, information for supplementing the reason why the occupant inputs the intention information via the input unit based upon the intention information inputted by the other occupant can be fed back as the related information. In other words, the reason why the occupant inputs the intention information is needed to obtain useful information from the collected intention information pieces, and this reason can be included in the related information to be fed back. In this case, the occupant can indicate the reason of inputting the intention information to the outside only by inputting the approval or rejection of the related information notified (displayed) by the notification unit.

According to another aspect, the present invention provides an information providing apparatus including an information collecting unit that collects information pieces supplied from plural vehicles; and an information providing unit that provides various information pieces related to the information pieces collected by the information collecting unit to at least an occupant of each of the vehicles, wherein the information collecting unit collects intention information, which is inputted by the occupant and indicates at least an intention of approving a condition involved with the occupant aboard the vehicle and an intention of rejecting the condition, from the plural vehicles. In this case, the condition involved with the occupant aboard the vehicle is a condition involved with the occupant aboard the vehicle in a real space.

In these cases, when the information collecting unit collects the intention information from one vehicle out of the plural vehicles, the information providing unit can provide information based upon intention information collected from other plural vehicles out of the plural vehicles to an occupant of the one vehicle. More specifically, in this case, the information provided by the information providing unit to the occupant of the one vehicle may be information related to a number of intention information pieces collected from the other plural vehicles by the information collecting unit, or information related to the intention information collected from the other plural vehicles by the information collecting unit, for example. In these cases, the information providing unit can provide information based upon intention information, which is collected from a vehicle of an occupant who has a predetermined relationship to the occupant of the one vehicle, out of intention information pieces collected from the plural vehicles by the information collecting unit, to the occupant of the one vehicle. In these cases, when the one vehicle out of the plural vehicles from which the information collecting unit collects the intention information pieces is on a specific position, the information providing unit can provide information based upon intention information collected from other plural vehicles out of the plural vehicles to an occupant of the one vehicle.

According to these configurations, the information collecting unit can collect intention information from plural vehicles. When the intention information is collected by the information collecting unit, the information providing unit can provide information based upon the collected intention information to the occupant of the vehicle as a feedback. Examples of the information provided as the feedback include information based upon the intention information collected from a vehicle where an occupant who has a predetermined relationship to the occupant of one vehicle, e.g., a friend or an acquaintance, is aboard. With this configuration, the occupant of the one vehicle can confirm the intention information of his/her friend in a place where he/she visits for the first time for a trip, whereby he/she can enjoy the trip. The information providing unit can provide the intention information based upon the intention information collected from the other plural vehicles, when the one vehicle is located on a specific position, regardless of whether the information collecting unit collects the intention information or not. With this configuration, the occupant of the one vehicle can well utilize the provided information.

According to another aspect of the present invention, the information providing unit includes an intention information accumulating unit that accumulates plural intention information pieces collected from the plural vehicles by the information collecting unit so as to be retrievable; and a reason supplementing unit that supplements a reason why the intention information collected by the information collecting unit is inputted and supplied from the vehicle, wherein the intention information accumulating unit accumulates the reason, which is supplemented by the reason supplementing unit, so as to be retrievable in association with the intention information collected by the information collecting unit.

According to this configuration, the diversity-carrying intention information can be collected from the plural vehicles and accumulated so as to be retrievable. In addition, the reason why each intention information piece is supplied from the corresponding vehicle (i.e., the reason why the intention information is inputted by the occupant of the vehicle) is supplemented, and the supplemented reason can be accumulated so as to be retrievable in association with the corresponding intention information. Therefore, a lot of intention information pieces, each having a small information amount, are collected in a wide range, and very useful information can be provided by using the supplemented reason obtained in relation to the collected information pieces. In addition, the intention information and the supplemented reason are stored in association with each other so as to be retrievable, in other words, a database is constructed. Therefore, a map or a graph can easily be generated based upon this database. Specifically, information can be visualized, whereby the use of the intention information can effectively be encouraged.

In this case, the intention information accumulating unit can accumulate the acquired intention information, and position information indicating a position of the vehicle when the intention information is inputted and time information indicating a time when the intention information is inputted, so as to be retrievable, the position information and the time information being associated with the acquired intention information, and the reason supplementing unit can supplement the reason why the intention information collected by the information collecting unit is supplied from the vehicle based upon the plural intention information pieces accumulated so as to be retrievable in the intention information accumulating unit, the plural position information pieces and time information pieces accumulated in association with each of the plural intention information pieces, and environment information indicating an environment around the vehicle indicated by the position information and the time information.

According to this configuration, the reason why the intention information is supplied from the vehicle can be correctly supposed with a certain extent of certainty, and can be supplemented (a hypothesis can be formed). Therefore, a lot of intention information pieces, each having a small information amount, are collected in a wide range, and the reason obtained in relation to the collected information pieces is correctly supplemented, whereby very useful information can be provided.

In these cases, the reason supplementing unit can present a response form encouraging the occupant of the vehicle to make a response about a reason why the intention information collected by the information collecting unit is supplied from the vehicle through a predetermined network service that can be used by the occupant of the vehicle, and supplement the reason why the intention information collected by the information collecting unit is supplied from the vehicle based upon the response according to the response form. More specifically, the reason supplementing unit can suppose the reason why the intention information collected by the information collecting unit is supplied from the vehicle based upon the plural intention information pieces accumulated in the intention information accumulating unit, present the supposed reason to the occupant through the predetermined network service as well as present a response form encouraging the occupant to make a response as to whether the supposed reason is true or not, and supplement the reason why the intention information collected by the information collecting unit is supplied from the vehicle based upon the response in accordance with the response form. In this case, the predetermined network service is a social networking service of a closed community that the occupant of the vehicle joins.

This configuration can allow the occupant of the vehicle that supplies the intention information to confirm and supplement the supposed (hypothesized) reason with the response form through a network service providing information only for members or a social networking service (SNS) that is a predetermined closed community. Therefore, a lot of intention information pieces, each having a small information amount, are collected in a wide range, and the reason obtained in relation to the collected information pieces is determined, whereby very useful information can be provided.

In these cases, the reason supplementing unit can present, to the occupant, plural intention information pieces from an occupant of other vehicle corresponding to the intention information collected by the information collecting unit, as well as a response form encouraging the occupant to make a response about the reason why the intention information is supplied from the vehicle, and supplement the reason why the intention information collected by the information collecting unit is supplied from the vehicle based upon the response in accordance with the response form.

According to this configuration, the occupant can make a response by referring to the intention information of the occupant of the other vehicle, whereby the occupant can easily make a response by using the response form. Therefore, a lot of intention information pieces, each having a small information amount, are collected in a wide range, and the reason obtained in relation to the collected information pieces is determined, whereby very useful information can be provided.

In this case, the predetermined network service is a social networking service of an open community that persons other than the occupant of the vehicle join. The plural intention information pieces from the occupant of other vehicle presented through the social networking service of an open community is presented with a nickname of the occupant of the other vehicle.

According to these configurations, the reason why the intention information is supplied from the vehicle can be supplemented with opinions of persons other than the occupant of the vehicle being reflected. Specifically, in this case, various persons can make an argument for the reason why the intention information is supplied from the vehicle by making communication with one another through the network service providing information only for members or the social networking service that is the predetermined open community, and can supplement the reason. In this case, if the position information or the time information is associated with the intention information, persons joining the SNS are easy to express their opinions for the intention information (presented subject). Thus, deeper communication can be made. Therefore, a lot of intention information pieces, each having a small information amount, are collected in a wide range, and the reason obtained in relation to the collected information pieces is determined, whereby very useful information based upon the situation can be provided.

In these configurations, the information providing apparatus further includes a point applying unit that applies a predetermined point to the response, when the response is made in accordance with the response form presented by the reason supplementing unit. According to this configuration, incentive to make a response according to the response form is given to the occupant, whereby a response rate can be increased. Therefore, a lot of intention information pieces, each having a small information amount, are collected in a wide range, and the reason obtained in relation to the collected information pieces is efficiently determined, whereby very useful information based upon the situation can be provided.

According to still another aspect of the present invention, the present invention provides an information providing system including: an information inputting apparatus having an input unit provided in a compartment of a vehicle and operated by an occupant of the vehicle; and an information providing apparatus including an information collecting unit that collects information pieces supplied from plural vehicles including the information inputting apparatus, and an information providing unit that provides various information pieces related to the collected information pieces to at least an occupant of each of the vehicles, wherein the input unit in the information inputting apparatus is used by the occupant to input intention information indicating at least an intention of approving a condition involved with the occupant aboard the vehicle and an intention of rejecting the condition, the information collecting unit in the information providing apparatus collects intention information, which is inputted via the input unit in the information inputting apparatus, from the plural vehicles, and the information providing unit in the information providing apparatus includes: an intention information accumulating unit that accumulates plural intention information pieces collected from the plural vehicles by the information collecting unit so as to be retrievable; and a reason supplementing unit that supplements a reason why the intention information collected by the information collecting unit is supplied from the vehicle. In this case, the condition involved with the occupant aboard the vehicle is a condition involved with the occupant aboard the vehicle in a real space.

In these cases, the input unit in the information inputting apparatus is connected to an on-vehicle device, which can be mounted on the vehicle and includes a communication unit communicating with an outside of the vehicle, so as to be capable of making communication, and supplies the intention information to the on-vehicle device according to an input operation by the occupant, and the on-vehicle device can transmit the intention information supplied according to the operation on the input unit by the occupant to the information providing apparatus. In this case, the communication unit in the on-vehicle device can transmit condition information, which is related to the condition involved with the occupant aboard the vehicle, to the information providing apparatus in association with the intention information, when the occupant inputs the intention information via the input unit.

In these cases, the information inputting apparatus can include a notification unit that acquires related information related to an input of the intention information by the occupant via the input unit from the information providing apparatus via the communication unit in the on-vehicle device, and notifies the occupant of the acquired related information. In this case, the related information is accumulated in the intention information accumulating unit in the information providing apparatus, and is based upon intention information inputted by an occupant of other vehicle for the condition when the occupant inputs the intention information via the input unit. In this case, the related information is acquired from the information providing apparatus through a predetermined network service that can be used by the occupant.

In these cases, the reason supplementing unit in the information providing apparatus can present a response form encouraging the occupant of the vehicle to make a response about a reason why the intention information collected by the information collecting unit is supplied from the vehicle through a predetermined network service that can be used by the occupant of the vehicle, and supplement the reason why the intention information collected by the information collecting unit is supplied from the vehicle based upon the response according to the response form.

According to these configurations, the reason of input needed by the occupant of the vehicle to provide useful information for the intention information that has a small amount of information can appropriately be supplemented, whereby useful related information for the input of the intention information can appropriately be fed back. The occupant of the vehicle can obtain very useful information for clarifying a true point of the condition that should be improved by collecting a lot of intention information pieces indicating the rejection of the condition and their reasons of input through the SNS. Accordingly, a car manufacturer can reflect the point that should be improved on a manufacture of vehicles, with the result that a car life shared by occupants is enhanced, or such information can be useful information for developing better towns for a society.

BRIEF DESCRIPTION OF THE DRAWINGS

FIG. 14 is a diagram for describing a database constructed according to the reason-of-depression supposing program executed by the server in the information providing center.

BEST MODE FOR CARRYING OUT THE INVENTION

Figure 1:
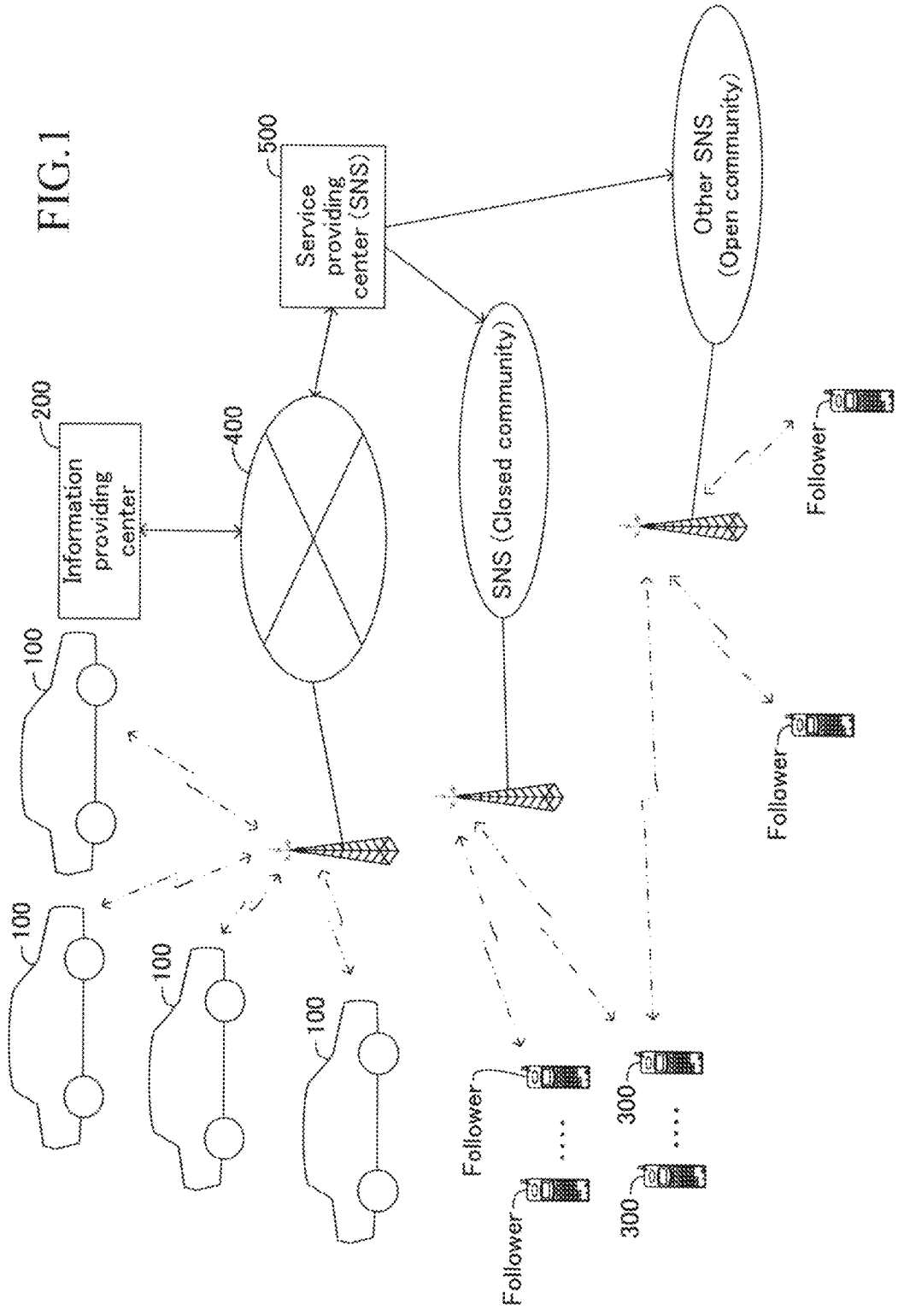
FIG. 1 is a schematic block diagram illustrating a vehicle information providing system including an information inputting apparatus and an information providing apparatus according to an embodiment of the present invention.

Hereinafter, an information inputting apparatus, an information providing apparatus, and an information providing system including the information inputting apparatus and the information providing apparatus according to an embodiment of the present invention will be described with reference to the drawings. FIG. 1 is a schematic block diagram schematically illustrating an information providing system according to the present invention.

In the information providing system, plural vehicles 100, an information providing center 200, and a portable information terminal 300 owned by a driver or a fellow passenger (hereinafter sometimes referred to as an "occupant" or a "user") of the vehicle 100 are organically connected via a secure network 400 (e.g., the Internet, a leased line network, etc.) such that various services and various pieces of information can be provided to the occupant of the vehicle 100. The information providing system also includes a service providing center 500 which is connected to the network 400 in order to provide a social networking service that is a closed community (hereinafter referred to as a closed SNS). The service providing center 500 provides contractors (so-called followers, etc.) who have concluded a service provision contract, including the user of the vehicle 100, with information received from the vehicle 100 via the information providing center 200. The service providing center 500 can also collaborate with other social networking services that are open communities (hereinafter referred to as open SNSs).

Figure 2:
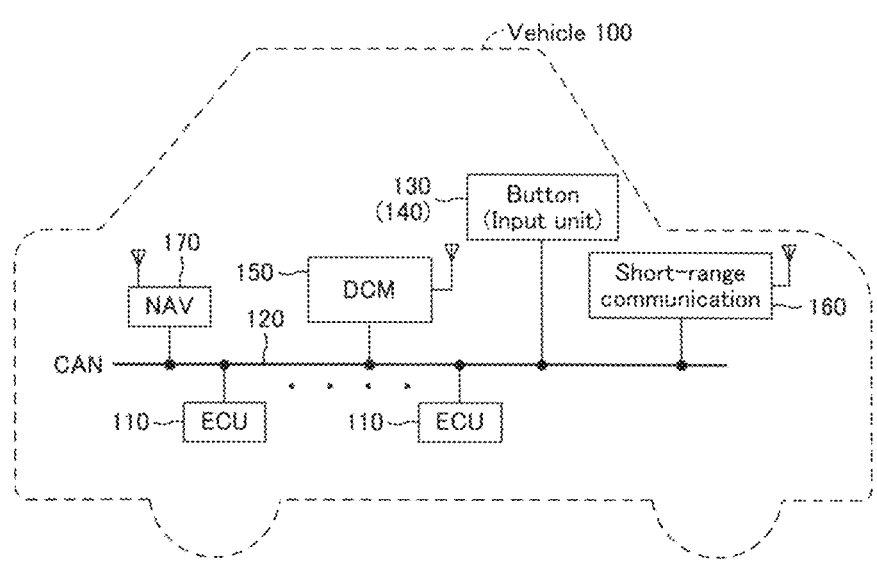
FIG. 2 is a block diagram schematically illustrating a configuration of a vehicle (information inputting apparatus) illustrated in FIG. 1.

As illustrated in FIG. 2, the vehicle 100 having mounted thereto an information inputting apparatus forming the information providing system includes plural electronic control units 110 (hereinafter referred to as vehicle ECUs 110) for controlling the state of the vehicle. The vehicle ECUs 110 are connected to a CAN communication line 120 of a CAN (Controller Area Network) communication system such that they can input and output various signals with one another through the CAN communication line 120. Each vehicle ECU 110 is mainly composed of a microcomputer including a CPU, a ROM, a RAM, and the like. Each vehicle ECU 110 has a memory, an input/output interface, and a drive circuit for driving various actuators using signals received from sensors.

Figure 3:
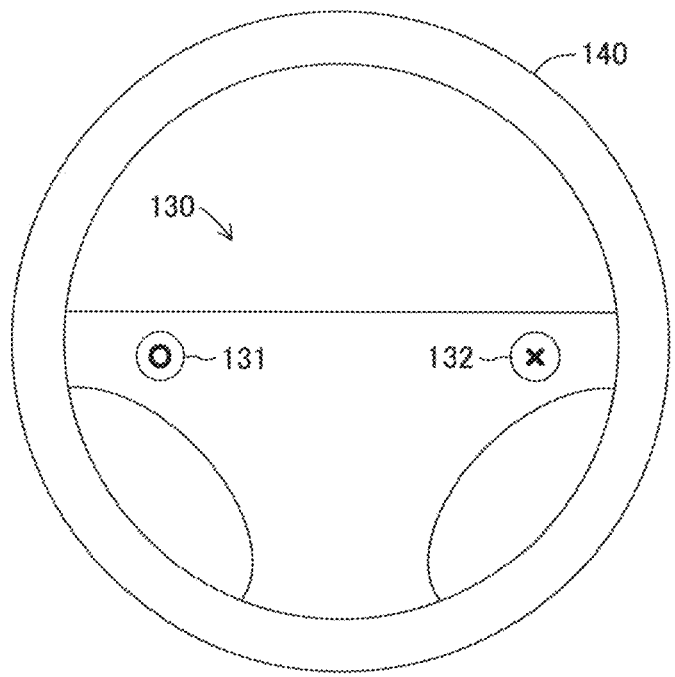
FIG. 3 is a schematic view for describing a state in which a button (positive button and negative button) illustrated in FIG. 2 is provided on a steering wheel 140.

The vehicle 100 includes a button 130 that serves as an input unit forming the information inputting apparatus. The button 130 is operated by the occupant (in the present embodiment, mainly a driver) for inputting his/her intention of approving a condition, which is involved with the occupant aboard the vehicle in a real space and which changes as the vehicle is moving, and for inputting his/her intention of rejecting the condition, which is involved with the occupant aboard the vehicle in a real space and which changes as the vehicle is moving. As illustrated in FIG. 3, the button 130 is composed of a positive button 131 (this positive button 131 is sometimes referred to as "like button 131" below) that is depressed for indicating the intention of approving the condition that changes as the vehicle is moving, in other words, for indicating that the occupant satisfies the current condition (actual condition), and a negative button 132 (this negative button 132 is sometimes referred to as "dislike button 132" below) that is depressed for indicating the intention of rejecting the condition that changes as the vehicle is moving, in other words, for indicating that the occupant does not satisfy the current condition (actual condition).

As illustrated in FIG. 3, the like button 131 and the dislike button 132 are mounted on a steering wheel 140 turned by the driver. With this configuration, when the driver depresses the positive button 131 (like button 131) since something good happens to the driver upon driving the vehicle 100, or when the driver depresses the negative button 132 (dislike button 132) since something bad happens to the driver upon driving the vehicle 100, the driver can keep holding the steering wheel. Accordingly, the depression of the button does not affect the driving of the vehicle 100. As illustrated in FIG. 2, the button 130 (the like button 131 and the dislike button 132) mounted on the steering wheel 140 is connected to the CAN communication line 120.

In addition, a data communication module 150 (hereinafter referred to as a DCM 150) for communicating with the information providing center 200 via the network 400 is connected to the CAN communication line 120. The DCM 150 can get access to (log in to) the network 400 by utilizing a portable base station in order that the DCM 150 can achieve data transmission with a later-described server 210 of the information providing center 200 or a later-described server 510 of the service providing center 500. The positive button 131 (like button 131) and the negative button 132 (dislike button 132), which serve as the input unit, are connected to the DCM 150 via the CAN communication line 120, whereby 1-bit information indicating whether the driver depresses these buttons 131 and 132 or not, i.e., intention information indicating the driver's intention of approving or rejecting the condition, is supplied to the DCM 150.

In addition, a short-range communication control apparatus 160 is connected to the CAN communication line 120 as a communication interface for performing short-range communication with the portable information terminal 300. In the present embodiment, this short-range communication control apparatus 160 employs Bluetooth (registered trademark) as a communication technology. Needless to say, the short-range communication control apparatus 160 may use other short-range radio communication technologies such as Wi-Fi (registered trademark).

In addition, a navigation apparatus 170 for guiding the vehicle 100 to its destination is connected to the CAN communication line 120. Although not illustrated, the navigation apparatus 170 includes a vehicle position detection unit which detects the position and heading direction of the vehicle 100, a memory which stores various types of data such as map data, a microcomputer which executes an application for guiding the vehicle 100 to its destination, a human interface which includes a touch-panel-type liquid-crystal display and a speaker, and so on.

Preferably, the vehicle 100 applied to the information communication system is an electric vehicle (EV) which includes a traction motor driven by electric power of battery, or a plug-in hybrid vehicle (PHV) which includes a traction motor, an internal combustion engine, and a battery which can be charged by a charger. However, the vehicle 100 may be a conventional vehicle which does not have a traction motor and which travels through use of power of the internal combustion engine. The vehicle 100 may be any drive type.

Figure 4:
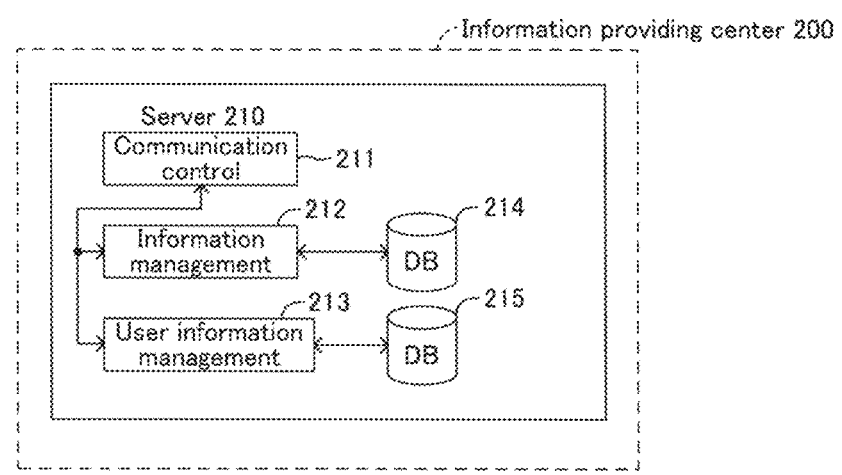
FIG. 4 is a block diagram schematically illustrating a configuration of an information providing center (information providing apparatus) illustrated in FIG. 1.

The information providing center 200 that forms the information providing system and that serves as the information providing apparatus is a facility for acquiring various pieces of information, including the intention information, from the DCM 150 of the vehicle 100, and for feeding back related information relating to the intention information to at least a user of the vehicle 100. As illustrated in FIG. 4, the information providing center 200 includes a server 210 which is mainly composed of a microcomputer. The server 210 includes a communication control section 211 which is connected to the network 400 so as to control communications, an information management server 212 which manages various pieces of information including the intention information, a user information management server 213 which manages user information of the vehicle, an information storage section 214 which stores a database of various pieces of information including the intention information (e.g., map information, road information, facility information, etc.), and a user information storage section 215 which stores a database of user information (e.g., account information of the user (the vehicle 100) which is used to access the closed SNS or open SNS (such as Facebook (registered trademark)) provided by the information providing center 200 and the service providing center 500).

The server 210 of the information providing center 200 retains relation information for establishing a relation between ID information for identifying the vehicle 100 (information representing the registration number of chassis number of the vehicle, or an account used for allowing the vehicle 100 to join the closed SNS) and ID information for identifying the user (the name of the user, the phone number of the portable information terminal 300, the mail address, account information for allowing the user to join the closed SNS, account information for allowing the user to join the open SNS) in the database of the user information storage section 215. According to this configuration, only by identifying either one of the ID information pieces, the information identified by the other ID information can be extracted.

Figure 5:
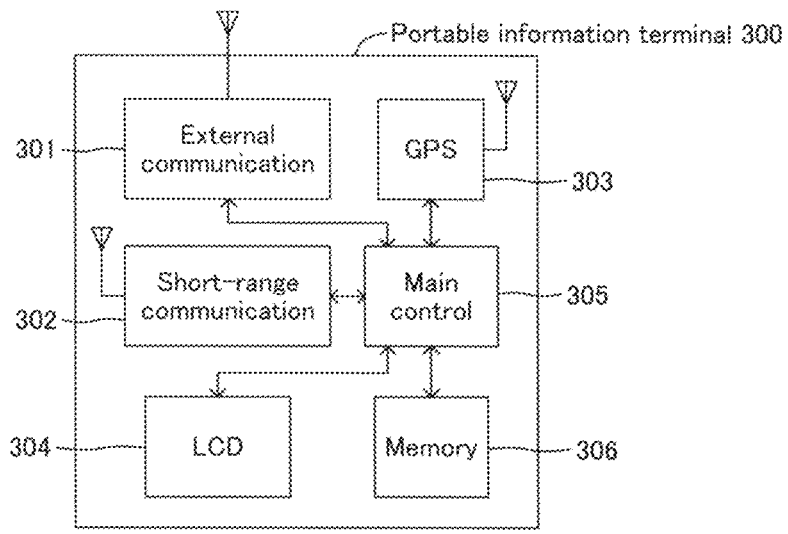
FIG. 5 is a block diagram schematically illustrating a configuration of a portable information terminal illustrated in FIG. 1.

As illustrated in FIGS. 1 and 5, the portable information terminal 300 owned by the user (occupant) includes an external communication control section 301 which is a communication interface used for connection to the secure network 400 and the closed SNS and the open SNS provided by the service providing center 500, a short-range communication control section 302 which is a communication interface used to perform short-range radio communication using Bluetooth (registered trademark), a GPS unit 303 which detects the coordinates of the current position of the portable information terminal 300 (or the vehicle 100 having mounted thereto the portable information terminal 300) using the radio waves from GPS satellites, a touch-panel liquid crystal display 304 which serves as a display panel and an operating panel, a main control section 305 which is mainly composed of a microcomputer and is adapted to execute communication control and various application programs, and a non-volatile memory 306 which stores various types of data such as application programs. For example, a cellular phone such as smartphone, a tablet terminal having an external communication function, or a notebook-type personal computer can be employed as the portable information terminal 300. In the present embodiment, the information terminal apparatus that can be brought by the user is employed. However, a personal computer (PC) that is placed in user' home and that can be connected to the network 400 can be used.

The user (particularly, the driver) of the vehicle 100 and the portable information terminal 300 can perform a process for pairing the vehicle 100 with the portable information terminal 300 in advance. By means of pairing the vehicle 100 with the portable information terminal 300 in advance, information can be exchanged seamlessly. For example, when the driver depresses the button 130 (the like button 131 and the dislike button 132) provided on the steering wheel 140, the intention information can be transmitted to the information management center 200 by utilizing the portable information terminal 300, instead of the DCM 150. Also, various pieces of information that the portable information terminal 300 is obtaining in real time from the information providing center 200 via the network 400 can be outputted to the touch-panel-type liquid-crystal display and the speaker of the navigation apparatus 170 via the CAN communication line 120. Notably, since the pairing process for Bluetooth (registered trademark) devices is not related directly to the present invention, it will be described below only briefly.

In general, when a Bluetooth (registered trademark) device is used for the first time, a process (operation) called paring is required for identifying a counterpart device. In this case, the user (driver) of the vehicle 100 operates, for example, the short-range communication control apparatus 160 of the vehicle 100 to bring it into a searchable state in which it can search for the portable information terminal 300, i.e., the counterpart device. On the other hand, the user (driver) of the vehicle 100 operates the portable information terminal 300 so as to bring its short-range communication control section 302 into the searchable state via its main control section 305. Before the short-range communication control apparatus 160 and the short-range communication control section 302 are set into the searchable state, their settings for authentication/encryption are rendered the same.

By means of bringing the respective Bluetooth (registered trade mark) devices in the searchable state as mentioned above, Bluetooth (registered trademark) devices existing near the display of the navigation apparatus 170 or the touch-panel-type liquid-crystal display 304 of the portable information terminal 300, i.e., the vehicle 100 and the portable information terminal 300, are displayed. The user designates the vehicle 100 as a counterpart device of the portable information terminal 300, and designates the portable information terminal 300 as a counterpart device of the vehicle 100. After selecting the vehicle 100 and the portable information terminal 300 as the counterpart devices, the user enters the same passkey (authentication key (PIN)). The entered passkeys are exchanged with each other, whereby the pairing process is completed.

Once the paring process for taking advantage of Bluetooth (registered trademark) communications is completed between the vehicle 100 and the portable information terminal 300 as mentioned above, Bluetooth (registered trademark) connection is automatically established when the driver carrying the portable information terminal 300 gets into the vehicle 100 and sets an ignition switch (not shown) to the "accessory-on" operation position. Notably, when the connection (pairing) is established automatically, the establishment of the connection is notified to the user by the display of the navigation apparatus 170, for example.

Figure 6:
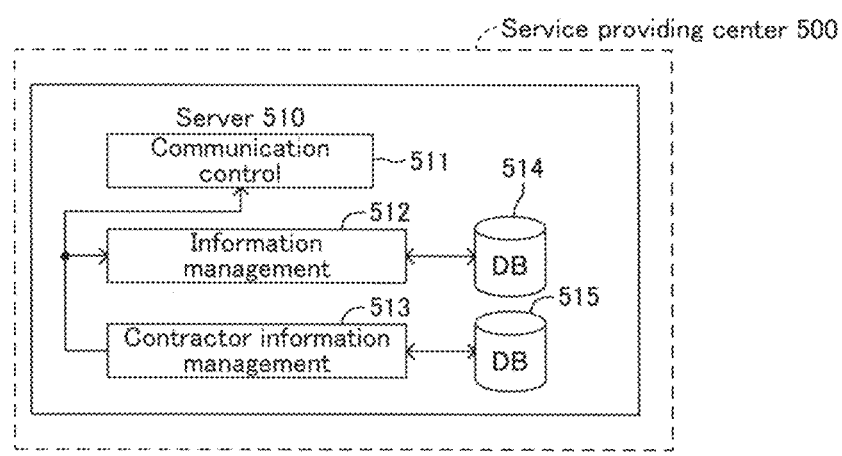
FIG. 6 is a block diagram schematically illustrating a configuration of a service providing center illustrated in FIG. 1.

As shown in FIG. 6, the service providing center 500 is a facility that discloses and provides the information (specifically, information indicating a later-described response form or a supposed reason why the button is depressed) related to the intention information supplied from the information providing center 200 to, for example, the contractors who have concluded a social networking service provision contract including the user of the vehicle 100, through the closed SNS or the open SNS. The service providing center 500 is provided with a server 510 mainly composed of a microcomputer. The server 510 includes a communication control section 511 which is connected to the network 400 and other centers (servers) providing the open SNS as shown in FIG. 1 and which controls communications; an information management server 512 which manages the information related to the intention information supplied from the information providing center 200; a contractor information management server 513 which manages information about the service contractors including the user of the vehicle 100; an information storage section 514 which stores a database of the supplied information related to the intention information;

and a contractor information storage section 515 which stores a database of contractor information (e.g., the ID information for identifying the user, the account information used by the contractor (including the vehicle 100) in order to join the closed SNS, the account information used by the contractor including the user in order to join the open SNS, etc.).

Figure 7:
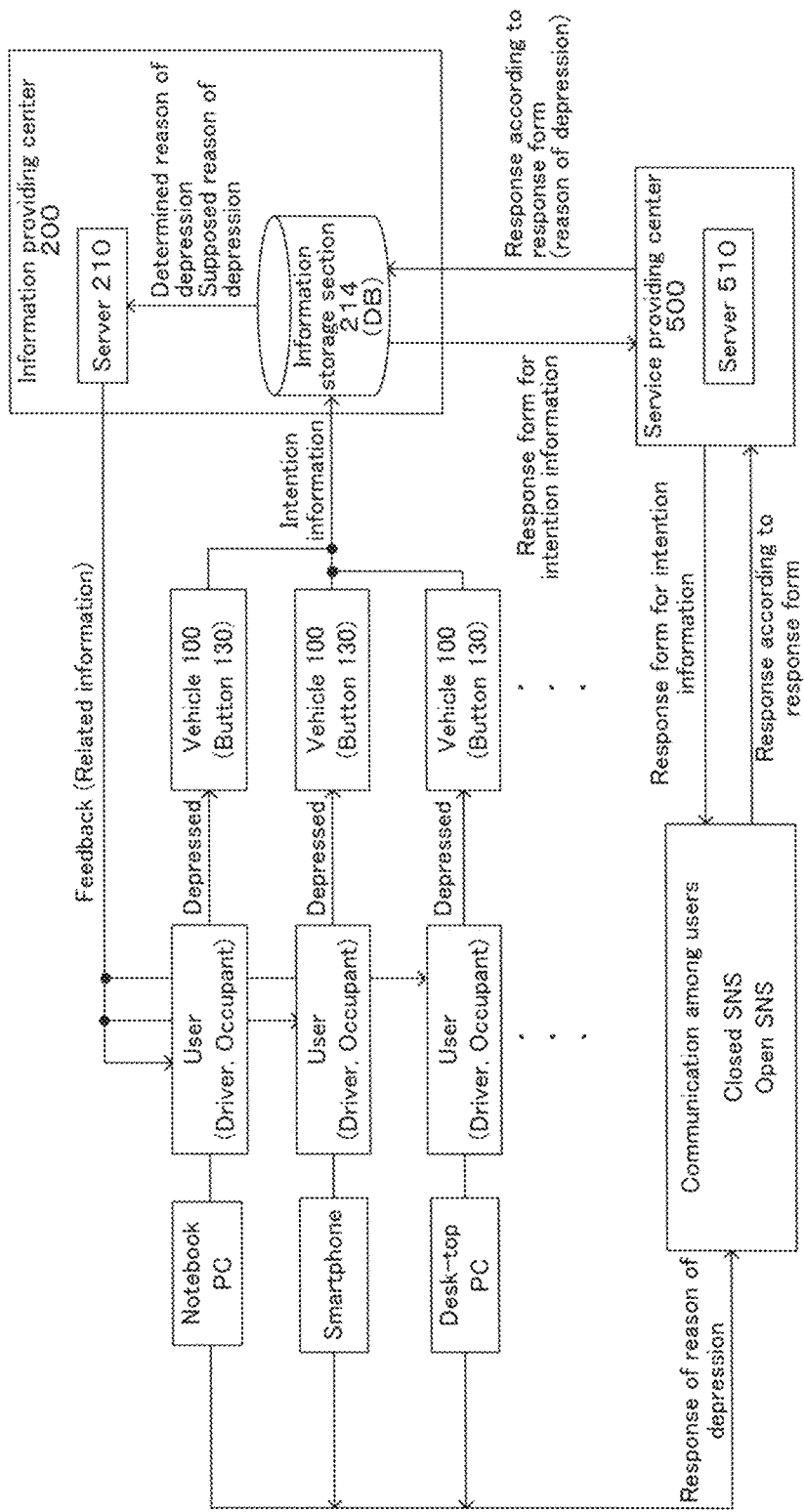
FIG. 7 is a flowchart for describing a flow of information by the vehicle (information inputting apparatus), the information providing center (information providing apparatus), the service providing center, and the portable information terminal illustrated in FIG. 1 according to the embodiment of the present invention.

Next, there will be described the vehicle information providing system configured as mentioned above, more specifically, the information inputting apparatus and the information providing apparatus forming the information providing system, with reference to FIG. 7. In the information providing system, when the button 130 (specifically, the positive button 131 and the negative button 132) provided on the steering wheel 140 serving as the input unit of the information inputting apparatus is depressed by the driver, i.e., the user, the depression of the button 130 is transmitted to the information providing center 200, serving as the information providing apparatus, as the intention information. In the information providing center 200, the server 210 acquires the transmitted intention information, i.e., 1-bit information indicating only the depression of the positive button 131 or the negative button 132. The server 210 accumulates and stores the intention information in the information storage section 214 in association with the reason why the intention information is transmitted. Thus, the information providing system provides the intention information transmitted from the vehicle 100 as useful information. The operation described above will be described in detail below.

(A) Input of Intention Information by Driver (Occupant)

When driving the vehicle 100, the driver can depress the button 130, i.e., the positive button 131 (like button 131) and the negative button 132 (dislike button 132), provided on the steering wheel 140 any time for any subject. Specifically, the driver depresses the positive button 131 (like button 131) anyway, when the driver approves (satisfies or likes) the condition in real space, which is involved with the driver aboard the vehicle and which changes with the travel or stop of the vehicle 100, such as a traffic condition, a driving environment, or a surrounding environment (including a place), or a health condition of the driver (occupant). On the other hand, the driver depresses the negative button 132 (dislike button 132) anyway, when the driver rejects (dissatisfies or dislikes) the condition in real space, which is involved with the driver aboard the vehicle and which changes with the travel or stop of the vehicle 100.

More specifically described, the driver depresses the positive button 131 (like button 131) anyway, when the driver subjectively satisfies the surrounding condition, which varies from hour to hour, upon driving the vehicle 100. Examples of the surrounding condition include a condition in which the driver can smoothly drive the vehicle 100 with no traffic jam, a condition in which the driver can exhilaratingly drive the vehicle on a winding road, a condition in which the driver can drive the vehicle with exhilarating acceleration, a condition in which the driver feels good after running over an uneven surface, a condition in which the driver can park the vehicle 100 without any trouble even in a narrow parking area, a condition in which the driver is in a location near a shop where the driver would like to visit, a condition in which there are parking areas where the driver is easy to park the vehicle on the periphery, and a condition in which the driver drives the vehicle in picturesque place. The driver also depresses the negative button 132 (dislike button 132) anyway, when the driver subjectively dissatisfies the surrounding condition including a condition in which the driver is stuck in a traffic jam or a traffic jam occurs ahead, a condition in which the driver unsatisfactorily drives through a curve, a condition in which the driver cannot accelerate as he/she wants, a condition in which an amount of turning the steering wheel 140 is large, a condition in which the vehicle wildly shakes up and down upon going over an uneven surface, a condition in which a street near a shop the driver would like to visit is very narrow, or a road ends and the driver has to make a detour, a condition in which the vehicle is difficult to be parked in a parking area where the driver intends to park the vehicle, a condition in which a shop guided by the navigation apparatus 170 is changed (the map information is incorrect), and a condition in which the driver has a stomachache or headache.

The positive button 131 and the negative button 132 are respectively provided on the steering wheel 140. Therefore, the driver can depress these buttons as always gripping the steering wheel 140, in other words, the driver can depress these buttons without affecting the driving of the vehicle 100, i.e., as being concentrated on driving the vehicle 100. Accordingly, the driver can depress the positive button 131 or the negative button 132 at any time without hesitation for the ever-changing condition.

When the positive button 131 (like button 131) or the negative button 132 (dislike button 132) is depressed as described above, 1-bit information indicating that one of these buttons 131 and 132 is depressed, i.e., the intention information indicating an intention of the approval by the operation of the positive button 131 or the intention information indicating an intention of the rejection by the operation of the negative button 132, is supplied to the DCM 150 via the CAN communication line 120. The DCM 150 transmits the supplied intention information to the information providing center 200 through the network 400.

In this case, the DCM 150 acquires the position information indicating the position of the vehicle 100 when the positive button 131 or the negative button 132 is depressed by the driver from the navigation apparatus 170 that can make communication via the CAN communication line 120. The DCM 150 also acquires time information indicating a time when the driver depresses the positive button 131 or the negative button 132, i.e., when the driver inputs the intention information, from the navigation apparatus 170 that can make communication via the CAN communication line 120.

The DCM 150 transmits the intention information, the position information, and the time information to the information providing center 200 via the network 400 together with the vehicle account information assigned beforehand for identifying and specifying the vehicle 100 and the user account information acquired beforehand for identifying the driver. In the description below, the information pieces transmitted from the vehicle 100 are sometimes collectively referred to as transmission information. In the information providing center 200, the server 210 receives the transmitted vehicle account information, the user account information, the intention information, the position information, and the time information.

The vehicle account information is needed for an access to (log-in to) the information providing center 200, and for participation in the closed SNS provided by the service providing center 500. In the present embodiment, the vehicle account information includes vehicle-type information indicating a type (a model) of the vehicle 100. The user account information is needed for an access to (log-in to) the information providing center 200, and for participation in the closed SNS or the open SNS provided by the service providing center 500. For example, the driver inputs the user account information by operating the touch-panel-type display of the navigation apparatus 170 before starting to drive the vehicle 100.

Since the button 130 (the positive button 131 and the negative button 132) is provided on the steering wheel 140 as described above, the driver of the vehicle 100 can very easily depress the positive button 131 or the negative button 132 at any time (without any load) for inputting the intention information of approving (satisfying) the condition in a real space, which is involved with the driver aboard the vehicle and which changes from hour to hour as the vehicle 100 is moving, or the intention information of rejecting (dissatisfying) the condition in a real space, which is involved with the driver aboard the vehicle and which changes from hour to hour as the vehicle 100 is moving, to the DCM 150 that can communicate with the information providing center 200. Thus, the intention of the driver driving the vehicle 100, i.e., the intention information that is a minimum of 1-bit information (digital information) indicating the approval or the rejection, can appropriately be outputted to the outside.

Accordingly, when the driver depresses the negative button 132 (dislike button 132) since the driver does not satisfy the driving vehicle 100, the server 210 in the information providing center 200 can acquire this intention information. The server 210 in the information providing center 200 collects such intention information from a lot of vehicles 100, and clarifies the reason why the button is depressed, as described later. With this, a car manufacturer can collect silent majority to the vehicle 100, thereby being capable of specifying a point that should be improved for the vehicle 100 and developing a better vehicle. The intention information inputted by the depression of the positive button 131 or the negative button 132 is transmitted to the information providing center 200 connected through the network 400, and further connected to the SNS by the service providing center 500 as described below, whereby the driver of the vehicle 100 can really feel that he/she connects the network (particularly SNS).

In this case, it is effective that the information providing center 200 classifies the vehicle 100 into a certain group (such as a group of announced brand-new cars) and counts the number of times of the depression operation with the clarified depression reason for each group, in order to encourage the driver (occupant) to more positively depress the button 130 (the positive button 131 or the negative button 132). By counting the number of times of the depression operation for each group, the information providing center 200 can notify all drivers (occupants) in this group of the situation in which the number of times exceeds a certain delimiter, every time the number of times of the depression operation exceeds the certain delimiter. Alternatively, the information providing center 200 can notify all drivers (occupants) in this group of the result of the competition in the increasing speed of the number of times of the depression operation among the groups. Consequently, the driver (occupant) can positively depress the button 130 without getting bored according to the notification from the information providing center 200. As a sales promotion of a brand-new car, a car manufacturer or car dealer can give significance of the brand-new car to public by announcing the number of times of operating the "like button" depressed by a driver (occupant) of the brand-new car, instead of announcing number of sales of brand-new car, which has conventionally been done.

In the present embodiment, the positive button 131 and the negative button 132 are respectively provided on the steering wheel 140 as special buttons. In this case, the positive button 131 and the negative button 132 provided on the steering wheel 140 can appropriately be arranged (replaced) according to a dominant hand of a driver, i.e., a user. With this, a satisfactory operability depending upon a driver can be assured, whereby the driver can input the intention information in real time.

Other buttons for operating devices mounted on the vehicle 100 may be provided on the steering wheel 140. In view of this, upon embodying the present invention, the number of buttons on the steering wheel 140 can be reduced, and only one button 130 may be provided in order to realize space saving and cost reduction. In this case, it can be configured such that the intention of approving the condition is indicated when the driver depresses the button 130 once, the intention of rejecting the condition is indicated when the driver depresses the button 130 twice, and the input of the intention information is canceled when the driver depresses the button 130 three times. According to this configuration, the number of buttons can appropriately be reduced on the steering wheel 140 that can provide the most satisfactory operability, with the result that the driver can intuitively depress the button.

It can also be configured such that the driver can input the degree of approval or the degree of rejection of the condition according to a depression manner, when the driver depresses the positive button 131 or the negative button 132. For example, when the driver touches and holds the positive button 131 or the negative button 132, the degree of "like" or "dislike" may be increased. With this configuration, the intention information of the driver can appropriately be inputted only by a simple operation.

As described later, in the present embodiment, the intention information that is 1-bit information is only transmitted (supplied) only by the driver's depression of the positive button 131 or the negative button 132, so that the information is insufficient (lacked). Specifically, the reason of the input, i.e., the reason why the driver depresses the button, that is, why the driver approves the condition or why the driver rejects the condition, is unclear. This is caused because the very simplified input operation of only depressing the button 130 (the positive button 131 or the negative button 132) provided on the steering wheel 140 is employed in order to prevent the input operation from affecting the driving of the vehicle 100.

In this case, the reason of approving or rejecting the condition, i.e., the reason of the depression operation, may be set beforehand in association with the number of times of the depression of the positive button 131 or the negative button 132, for example, for the depression manner of the button 130. With this configuration, the driver can correctly input the reason why he/she depresses the button. In the case where the reason of the depression operation is associated with the number of times of depressing the button, the portable information terminal 300 connected by using the on-vehicle devices, such as the DCM 150, the navigation apparatus 170, and the short-range communication control apparatus 160, so as to be capable of communicating with the button 130 (the positive button 131 and the negative button 132) through the CAN communication line 120 can interpret the reason of the depression operation corresponding to the number of times of the depression, and transmit the interpreted reason of the depression operation to the information providing center 200 with the intention information. With this configuration, the reason of the depression operation can be clarified to some extent, whereby the precision of the reason of the depression operation set as described later can be enhanced.

As a more simplified embodiment in the case where the reason of the depression operation can preliminarily be determined corresponding to the number of times of depressing the button 130 as described above, the reason why the positive button 131 or the negative button 132 is depressed can be determined, regardless of the number of times of the depression, and the reason of the depression operation can be supplemented later so that the reason of the depression operation is easy to be determined. With this configuration, the driver can easily supplement (makes a response about) the reason of the depression operation, for example, whereby the precision of determining the reason of the depression operation can be enhanced.

In the present embodiment, the button 130 including the positive button 131 and the negative button 132 is integrally provided on the steering wheel 140. In this case, the button 130 can be provided later on the steering wheel 140 by means of an attachment. With this configuration, the number of buttons provided on the steering wheel 140 can be reduced.

In the present embodiment, the button 130 including the positive button 131 and the negative button 132 is provided as a special button on the steering wheel 140. In this case, the other button that is provided on the steering wheel 140 and that can also be used for another function can be set as or converted into the button 130 (the positive button 131 and the negative button 132). When the button 130 is set as the special button, the driver, i.e., the user can intuitively depress the button (in real time).

In the present embodiment, the button 130 (the positive button 131 and the negative button 132) depressed by the driver is provided on the steering wheel 140 as the input unit. In this case, the input unit may be the one that is difficult to affect the driving of the vehicle 100. For example, a microphone is provided on the steering wheel 140 to enable an input by a voice of the occupant (driver). In this case, the occupant (driver) can input a voice indicating the intention of approving the condition, when he/she approves the condition, while he/she can input a voice indicating the intention of rejecting the condition, when he/she rejects the condition. In this case, the occupant (driver) can input a reason of inputting the approval of the condition or the reason of inputting the rejection of the condition, by his/her voice, and information indicating the inputted reason (corresponding to the reason of the depression operation) by his/her voice can be transmitted to the information providing center 200.

In the present embodiment, the button 130 (the positive button 131 and the negative button 132) depressed by the driver is provided on the steering wheel 140 as the input unit. In this case, as the input unit, an image recognition unit may be provided on the steering wheel 140 or a windshield of the vehicle 100 for inputting an expression on the occupant (driver) recognized by the image recognition unit, for example. In this case, the occupant (driver) allows the image recognition unit to recognize an expression (e.g., a smile) registered beforehand so as to express the intention of approval, when the occupant (driver) approves the condition. On the other hand, the occupant (driver) allows the image recognition unit to recognize an expression (e.g., a troubled expression) registered beforehand so as to express the intention of rejection, when the occupant (driver) rejects the condition. According to this configuration, the intention information approving the condition or the intention information rejecting the condition can be inputted.

(B) Construction of Database Accumulating Intention Information and Reason of Depression Operation (Reason of Input)

As described above, the server 210 in the information providing center 200 receives transmission information pieces from many vehicles 100 through the network 400 and the communication control section 211. The server 210 searches in the user information storage section 215 by using the vehicle account information included in each of the received transmission information pieces in cooperation with the user information management server 213 in order to authenticate the vehicle 100. The information management server 212 constructs the database illustrated in FIG. 8 at a predetermined storage position in the information storage section 214 based upon the intention information, the position information, and the time information included in the transmission information, for each of the received transmission information pieces, and stores this database such that this database can be updated.

Figures 8, 9:
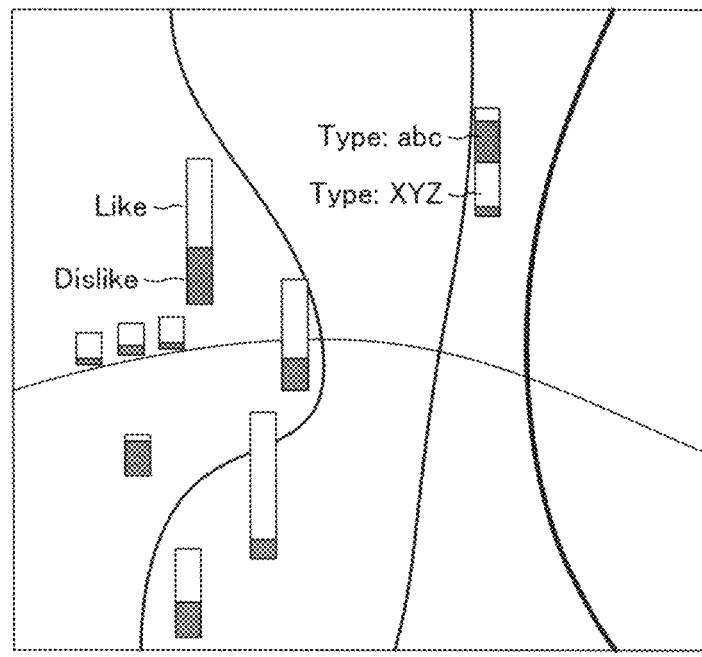
FIG. 8 is a diagram for describing a database constructed by the information providing center.
FIG. 9 is a view for describing map data that can be generated by using the database illustrated in FIG. 8.

Specifically, the information management server 212 constructs the database including the coordinate indicated by the position information, the time indicated by the time information, the type of the vehicle 100, the intention information, the number of times of transmitting the intention information having the coordinate (position information) almost matching the coordinate (the number of times of depressing the button 130 by the drivers of the plural vehicles 100), the determined (identified) reason of the depression operation (the determined (identified) reason of the depression operation is referred to as determined reason of depression below) as described later, and the supposed reason of the depression operation (the supposed reason of the depression operation is referred to as supposed reason of depression below) as described later. As illustrated in FIG. 9, the information management server 212 generates map data based upon the constructed database. On the map data, various information pieces can be displayed. Specifically, the information management server 212 generates the map data, which includes the result of counting "like" approving the condition and "dislike" rejecting the condition, and the result of classifying the counting results for each vehicle type, for each database for each coordinate or each time zone. These results can be displayed on the map data.

The map data illustrated in FIG. 9 can easily be generated by constructing the database as described above. This can visualize the information, whereby the use of the information can effectively be encouraged.

In the present embodiment, the whole database illustrated in FIG. 8 is classified based upon the coordinate. When the database is classified based upon the coordinate (position information), there may be the case in which the position information is specified in a narrow range, e.g., the case in which the button 130 is depressed near a certain specific shop, and the case in which a wide range has to be regarded as the same range, e.g., the case in which the button 130 is depressed along a certain specific road. In other words, upon constructing the database, the information management server 212 appropriately collects plural position information pieces (coordinates) in consideration of a degree of concentration in a position (place) or at a time.

In the present embodiment, the information management server 212 constructs the database so as to be capable of counting up the type of the vehicle 100. In this case, in order to more appropriately tally the type and finally provide more useful information pieces, the information management server 212 changes the method of tallying a lot of raw data pieces collected from plural vehicles 100, according to need, to catch a correct tendency. Specifically, examples of the method performed by the information management server 212 include a method of tallying the data pieces for each vehicle type, a method of tallying the data pieces regardless of a vehicle type, and a method of tallying the data pieces for each vehicle model (specifically, for light cars, standard-sized cars, RV cars, and the like).

(C) Feedback of Related Information Related to Input of Intention Information

When acquiring the transmission information from many vehicles 100, the information providing center 200 constructs the database described above, and stores the same into the information storage section 214. In this case, the server 210 in the information providing center 200 gives the related information related to the input of the intention information as a feedback upon the depression of the button 130 by the driver (occupant) of the vehicle 100, i.e., upon the input of the intention information, in order to enhance a precision of the information in the database, particularly a precision of determining the reason of depression.

Figure 10:
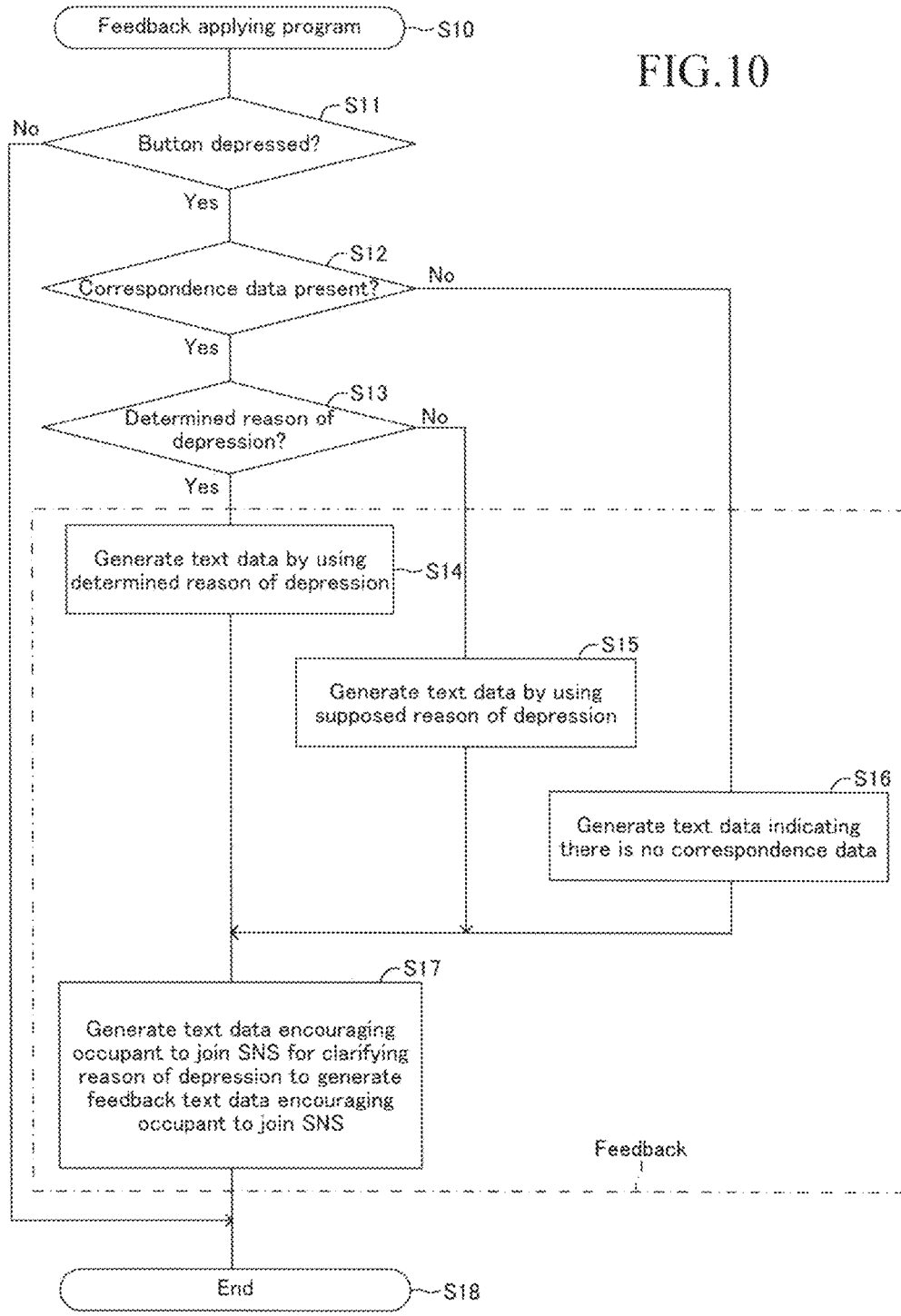
FIG. 10 is a flowchart illustrating a feedback applying program executed by a server in the information providing center illustrated in FIG. 4 when the positive button or the negative button in the vehicle is depressed.
Figure 11:
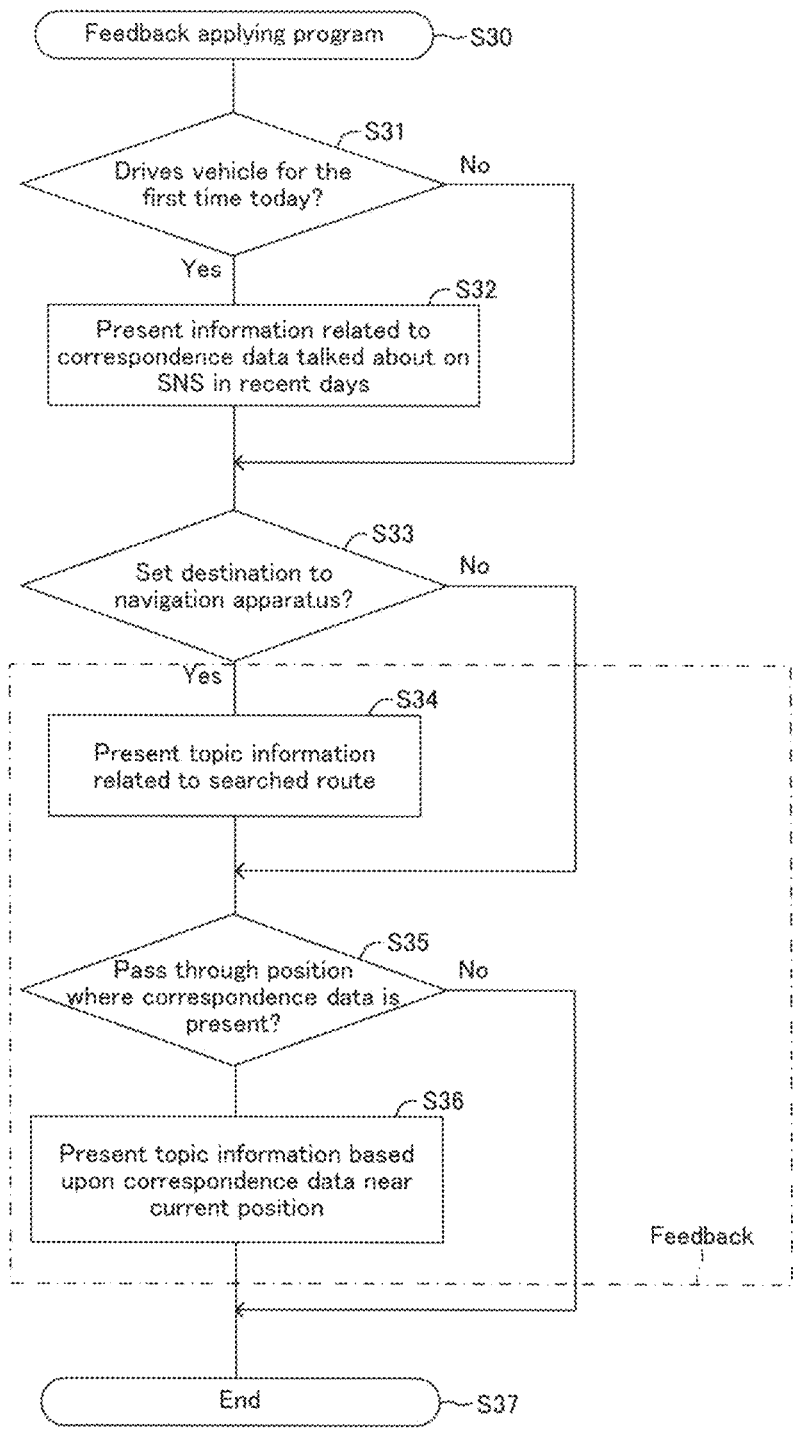
FIG. 11 is a flowchart illustrating a feedback applying program executed by a server in the information providing center illustrated in FIG. 4 when the positive button or the negative button in the vehicle is not depressed.

Specifically described, in cooperation with the information management server 212 and the information storage section 214, the server 210 executes a feedback applying program illustrated in FIG. 10 when the driver (occupant) of the vehicle 100 depresses the button 130 (in other words, the server receives the transmission information), and the server 210 executes a feedback applying program illustrated in FIG. 11 when the driver 100 is in a specific condition as the vehicle 100 is moving even when the button 130 is not depressed. The feedback applying program illustrated in FIG. 10 executed upon the depression of the button 130 will firstly be described below.

In step S10 in the flowchart illustrated in FIG. 10, the server 210 starts the execution of the feedback applying program, and in next step S11, the server 210 receives the intention information included in the transmission information from the vehicle 100. In other words, the server 210 determines whether the positive button 131 (like button 131) or the negative button 132 (dislike button 132) provided on the steering wheel 140 is depressed or not by the driver of the vehicle 100. When the positive button 131 or the negative button 132 is depressed by the driver, the server 210 determines as "Yes", and proceeds to step S12. When neither the positive button 131 nor the negative button 132 is depressed by the driver, the server determines as "No", and proceeds to step S18 where the server 210 temporarily ends the execution of the feedback applying program. After a lapse of a predetermined short period, the server 210 starts again the execution of the same program in step S10.

In step S12, the server 210 determines, in cooperation with the information management server 212, whether the database constructed corresponding to the coordinate indicated by the position information is stored or not at a predetermined storage position in the information storage section 214 based upon the position information included in the transmission information. In other words, the server 210 determines whether correspondence data corresponding to the intention information involved with the driver's depressing operation of the positive button 131 or the negative button 132 is present or not. When the correspondence data is present based upon the retrieval result of the information storage section 214 by the information management server 212 using the position information, the server 210 determines as "Yes", and proceeds to step S13. When the database is not constructed, and the correspondence data is not yet present, based upon the retrieval result by the information management server 212, the server 210 determines as "No", and proceeds to step S16.

In step S13, the server 210 acquires the correspondence data retrieved by the information management server 212, and determines whether or not the reason why the button 130 is depressed on the point specified by the position information out of items forming the correspondence data, i.e., the database, is the determined reason of depression that is already determined (identified) as described later. When the reason of depression is already determined (identified) for the acquired correspondence data, and is stored in the database that is the correspondence data, the server 210 determines as "Yes", and proceeds to step S14. When the reason why the button 130 is depressed on the point specified by the position information is still the unclear or undefined supposed reason of depression as described later, the server 210 determines as "No", and proceeds to step S15.

The server 210 gives feedback for the driver's operation of depressing the positive button 131 (like button 131) or the negative button 132 (dislike button 132) by executing the processes in steps S14 to S17. The process in each step will specifically be described below.

In step S14, the server 210 extracts the determined reason of depression from the correspondence data acquired in step S13, and presents the extracted determined reason of depression to the driver. Specifically, the server 210 generates text data in accordance with a predetermined format by using the extracted determined reason of depression. In this case, the server 210 generates text data inquiring whether or not the reason (intention) why the driver depresses the positive button 131 or the negative button 132 this time agrees with the determined reason of depression. The server 210 generates the text data by using the determined reason of depression, and then, proceeds to step S17. In this case, in place of or in addition to the generation of the text data presenting only the determined reason of depression, the server 210 can generate text data presenting information as to when a traffic jam is solved or information about a bypath, if the determined reason of depression is "occurrence of traffic jam".

In step S15, the server 210 extracts the supposed reason of depression from the correspondence data acquired in step S13, and presents the extracted supposed reason of depression to the driver. Specifically, the server 210 generates text data in accordance with a predetermined format by using the extracted supposed reason of depression. In this case, the server 210 generates text data inquiring whether or not the reason (intention) why the driver depresses the positive button 131 or the negative button 132 this time agrees with the supposed reason of depression. The server 210 generates the text data by using the supposed reason of depression, and then, proceeds to step S17.

In step S16, the server 210 suggests that there is no correspondence data present according to the determination process in step S12. Specifically, the server 210 generates text data indicating that there is no correspondence data present in accordance with a predetermined format. After generating the text data, the server 210 proceeds to step S17.

In step S17 that is executed after the execution of the processes in steps S14 to S16, the server 210 adds text data, indicating a message encouraging the occupant (driver) to join at least either one of the closed SNS and the open SNS for clarifying more the reason of depression, to the text data generated by executing the processes in steps S14 to S16. Thus, the server 210 generates last feedback text data that is fed back as the related information. The server 210 then transmits the feedback text data to the vehicle 100, outputting the transmission information, via the network 400.

The feedback text data transmitted (presented) from the server 210 in the information providing center 200 will specifically be described. The presented feedback text data may be displayed on a display device provided in the vehicle 100 as a notification unit, such as a display of the navigation apparatus 170 or the touch-panel-type liquid-crystal display 304 of the portable information terminal 300 that is paired in the compartment. It is effective that a predetermined alarm is issued from a speaker in the vehicle 100 upon displaying the feedback text data.

The case where the feedback text data is generated by using the determined reason of depression will firstly be described in detail. In this case, the tendency of the reason why the positive button 131 or the negative button 132 is depressed is already determined based upon a lot of transmission information pieces and later-described SNS comments. Therefore, the message displayed based upon the feedback text data is such that "XX persons say that there is only a few parking lots around here. Do you think so, too? If you don't think so, depress "dislike button". Please do join the SNS, and tell us the meaning of the button you depressed", and so on. In this case, the phrase "XX persons say that there is only a few parking lots around here" corresponds to the determined reason of depression, the phrase "Do you think so, too? If you don't think so, depress "dislike button"" corresponds to the part inquiring whether the reason of depression agrees with the determined reason of depression, and the phrase "Please do join the SNS, and tell us the meaning of the button you depressed" corresponds to the message encouraging the driver to join the closed SNS or the open SNS.

The case where the feedback text data is generated by using the supposed reason of depression will be described next. This case means that the tendency of the reason why the positive button 131 or the negative button 132 is depressed is not yet supposed. Therefore, the message displayed based upon the feedback text data is such that "XX persons depress the button around here. Did you depress the button for the reason of xx? If you did, depress the "like button", and do join the SNS to tell us the meaning of the button you depressed", for example. In this case, the phrase of "XX persons depress the button around here. Did you depress the button for the reason of xx?" corresponds to the supposed reason of depression, the phrase of "If you did, depress the "like button"" corresponds to the part inquiring whether the reason of depression matches the supposed reason of depression, and the phrase of "and do join the SNS to tell us the meaning of the button you depressed" corresponds to the message for encouraging the driver to join the closed SNS or the open SNS.

The case where the feedback text data indicating that there is no correspondence data is generated will be described next. This case means that the database corresponding to the coordinate (place) represented by the position information is not yet present. Therefore, the message displayed based upon the feedback text data is such that "You are the first person who depressed the button here. Please do join the SNS to tell us the meaning of the button you depressed", for example. In this case, the phrase of "You are the first person who depressed the button here" indicates that there is no correspondence data, and the phrase of "Please do join the SNS to tell us the meaning of the button you depressed" corresponds to the message for encouraging the driver to join the closed SNS or the open SNS.

After generating the feedback text data described above, and transmitting this feedback text data, the server 210 temporarily ends the execution of the feedback applying program in step S18, and after a lase of a predetermined short time, the server 210 starts again the execution of the same program in step S10.

Next, the feedback applying program illustrated in FIG. 11 executed when the button 130 is not depressed will be described.

The server 210 starts the feedback applying program in step S30 of the flowchart illustrated in FIG. 11, and in step S31, the server 210 determines whether or not the condition indicates that the driver drives the vehicle 100 for the first time today based upon vehicle information that is transmitted from the vehicle 100 at predetermined short intervals. If the condition indicates that the driver drives the vehicle 100 for the first time today based upon the vehicle information transmitted from the vehicle 100, such as information indicating that a start switch is turned ON in an EV or PHV, or information indicating that an ignition switch is turned ON in a vehicle having an internal combustion engine (engine), the server 210 determines as "Yes", and then, proceeds to step S32. On the other hand, if the condition does not indicate that the driver drives the vehicle 100 for the first time today, the server 210 determines as "No", and then, proceeds to step S33.

In step S32, the server 210 retrieves and acquires correspondence data, which is presented in a closed SNS or open SNS and becomes a popular topic, in cooperation with the information management server 212 and the information storage section 214 as described later. The server 210 then provides the topic that is related to the acquired correspondence data and talked about on the SNS to the vehicle 100.

Specifically described, the server 210 can present the database (correspondence data) including the supposed reason of depression to an SNS that is a closed community or to the other SNSs that are open communities in cooperation with the server 510 in the service providing center 500 as described later. The server 210 presents the correspondence data, and when the supposed reason of depression becomes the determined reason of depression, for example, the server 210 acquires this correspondence data through the information management server 212. The server 210 also acquires topics that are talked about on the SNS that is the closed community and the SNSs that are the open communities from the server 510 in the service providing center 500, in connection with comments posted until the supposed reason of depression becomes the determined reason of depression.

The server 210 acquires the user account information associated with the vehicle account information of the vehicle 100 determined in step S31, out of the acquired correspondence data pieces, from the user information storage section 215 in cooperation with the user information management server 213. Thus, the occupant (driver) using the vehicle 100 is specified. Then, the server 210 extracts the correspondence data related to the occupant (driver), i.e., the user account information. The server 210 generates the tendency related to the correspondence data on the SNS, such as text data indicating an increase in the number of "likes", according to a predetermined format. In addition to the text data, the server 210 generates text data indicating topics talked about on the SNS in accordance with a predetermined format, and generates final text data that is to be provided. The server 210 then provides the generated text data to be provided to the vehicle 100 via the network 400.

Specific examples of the provided text data transmitted (provided) from the server 210 in the information providing center 200 include "Hello. Please drive safely today. XX persons click "like" to your "like". They say XX shop has a good reputation on SNS. Please try and go there". The phrase of "XX persons click "like" to your "like"" indicates the topic related to the correspondence data, the phrase of "They say XX shop has a good reputation on SNS. Please try and go there" indicates the topic talked about on the SNS. After transmitting the provided text data to the vehicle 100, the server 210 proceeds to step S33.

The provided text data may be displayed on the display device provided in the vehicle 100 as a notification unit, such as the display of the navigation apparatus 170 or the touch-panel-type liquid-crystal display 304 of the portable information terminal 300 that is paired in the compartment, as in the case described previously. It is also effective that a predetermined alarm is issued from the speaker in the vehicle 100 upon displaying the provided text data.

In step S33, the server 210 determines whether or not the occupant (driver) sets a destination to the navigation apparatus 170 based upon the vehicle information transmitted from the vehicle 100. When determining that the destination is set to the navigation apparatus 170 based upon the information indicating the operating condition of the navigation apparatus 170, out of the acquired vehicle information pieces, the server 210 determines as "Yes", and proceeds to step S34. When determining that the destination is not set to the navigation apparatus 170 based upon the information indicating the operating condition of the navigation apparatus 170, the server 210 determines as "No", and proceeds to step S35. When the navigation apparatus 170 is operated based upon the operating condition of the navigation apparatus 170, the server 210 requests to the navigation apparatus 170 to transmit the position information indicating the current position of the vehicle 100 detected at predetermined time intervals and heading-direction information indicating the heading direction of the vehicle 100 via the network 400. According to this request, the navigation apparatus 170 transmits the position information and the heading-direction information to the information providing center 200 at predetermined time intervals via the network 400.

Even when the button 130 (the positive button 131 or the negative button 132) is not depressed, the server 210 applies the feedback according to the travel of the vehicle 100 to encourage the driver to positively depress the positive button 131 or the negative button 132 by executing the processes in steps S34 to S36. The process in each step will specifically be described below.

In step S34, the server 210 acquires correspondence data on a searched route to the set destination based upon the information indicating the operating condition of the navigation apparatus 170 and the position information sequentially transmitted from the navigation apparatus 170, in cooperation with the information management server 212 and the information storage section 214. The server 210 then sequentially provides the topic (determined or supposed reason of depression) involved with the searched route to the destination, based upon the acquired correspondence data.

Specifically described, the server 210 searches in the information storage section 215 by using the coordinate indicated by the position information transmitted from the navigation apparatus 170, and acquires correspondence data having a coordinate almost matching this coordinate, in cooperation with the information management server 212. The server 210 then extracts the determined reason of depression or the supposed reason of depression from the acquired correspondence data, and presents the extracted determined reason of depression or the supposed reason of depression to the occupant (driver). Specifically, by using the extracted determined reason of depression or the supposed reason of depression, the server 210 generates the text data according to the predetermined format as the feedback text data for the driver driving the vehicle 100 to the destination. The server 210 transmits the generated feedback text data to the vehicle 100 via the network 400. In this case, the server 210 sequentially transmits the feedback text data corresponding to the current position of the vehicle 100 based upon the position information sequentially transmitted from the navigation apparatus 170.

Specific examples of the feedback text data transmitted (provided) from the server 210 in the information providing center 200 include "XX persons say your route has many traffic jams, and it is hard work to drive during AM 7:00~AM 10:00. Try rerouting!" When approving the provided information (condition), the driver (occupant) of the vehicle 100 to which the information described above is provided can depress the positive button 131, and when rejecting, the driver (occupant) can depress the negative button 132. Since the information described above is provided, the frequency of the operation of the button 130 by the occupant (driver) can appropriately be increased, with the result that the number of the transmission information pieces transmitted by the depressing operation is increased. Thus, the precision of determining the reason of depression can be enhanced. The phrase of "XX persons say your route has many traffic jams, and it is hard work to drive during AM 7:00~AM 10:00" indicates the determined reason of depression or the supposed reason of depression. After transmitting the feedback text data as described above, the server 210 proceeds to step S35.

In this case, the feedback text data may be displayed on the display device provided in the vehicle 100 as a notification unit, such as the display of the navigation apparatus 170 or the touch-panel-type liquid-crystal display 304 of the portable information terminal 300 that is paired in the compartment, as in the case described previously. It is also effective that a predetermined alarm is issued from the speaker in the vehicle 100 upon displaying the provided text data.

In step S35, the server 210 determines whether or not the vehicle 100 passes the position (place, point) where the correspondence data is present, based upon the position information sequentially transmitted from the navigation apparatus 170 of the vehicle 100 and the heading-direction information. Specifically, the server 210 specifies the position (place) where the vehicle 100 travels and the heading direction based upon the position information and the heading-direction information acquired from the navigation apparatus 170. Then, the server 210 retrieves and acquires the database, i.e., the correspondence data, stored at the predetermined storage position in the information storage section 214 in association with the coordinate near this position (place), by using the specified position (place) and the heading direction of the vehicle 100, in cooperation with the information management server 212.

When the vehicle 100 passes the position (place, point) where the correspondence data is present, in other words, when the correspondence data can be retrieved and acquired, the server 210 determines as "Yes", and proceeds to step S36. When the vehicle 100 does not pass the position (place, point) where the correspondence data is present, in other words, when the correspondence data cannot be retrieved and acquired, the server 210 determines as "No", and proceeds to step S37.

In step S36, the server 210 sequentially provides the topic (determined or supposed reason of depression) near the current position according to the heading direction of the vehicle 100, for example, based upon the plural correspondence data pieces retrieved by the information management server 212 in step S35.

Specifically described, the server 210 extracts correspondence data having a coordinate near the current position of the vehicle 100 out of the acquired plural correspondence data pieces, based upon the position information acquired from the navigation apparatus 170. The server 210 extracts the determined reason of depression or the supposed reason of depression from the extracted correspondence data pieces, for example, and presents the extracted determined reason of depression or the supposed reason of depression to the occupant (driver). Specifically, the server 210 generates text data in accordance with a predetermined format by using the extracted determined reason of depression or the supposed reason of depression as the feedback text data for the driver driving the vehicle 100. The server 210 then sequentially transmits the generated feedback text data to the vehicle 100 via the network 400.

Specific examples of the feedback text data transmitted (provided) from the server 210 in the information providing center 200 to the driver driving the vehicle 100 include "They say XX shop around here has a good reputation on SNS. Please try and go there". When approving the provided information (condition), the driver (occupant) of the vehicle 100 to which the information described above is provided can depress the positive button 131, and when rejecting, the driver (occupant) can depress the negative button 132. Since the information described above is provided, the frequency of the operation of the button 130 by the occupant (driver) can appropriately be increased, with the result that the number of the transmission information pieces transmitted by the depressing operation is increased. Thus, the precision of determining the reason of depression can be enhanced. The phrase of "They say XX shop around here has a good reputation on SNS. Please try and go there" corresponds to the state of indicating the determined reason of depression or the supposed reason of depression. After transmitting the feedback text data as described above, the server 210 proceeds to step S37.

In this case, the feedback text data may be displayed on the display device provided in the vehicle 100 as a notification unit, such as the display of the navigation apparatus 170 or the touch-panel-type liquid-crystal display 304 of the portable information terminal 300 that is paired in the compartment, as in the case described previously. It is also effective that a predetermined alarm is issued from the speaker in the vehicle 100 upon displaying the provided text data.

In step S37, the server 210 temporarily ends the feedback applying program. After a lapse of a predetermined short time, the server 210 again starts the execution of the same program.

As described above, the server 210 in the information providing center 200 can appropriately give feedback by providing (transmitting) the feedback text data that is the related information, when the server 210 receives the transmission information, i.e., when the intention information is inputted by the driver of the vehicle 100 depressing the button 130 (the positive button 131 or the negative button 132) provided on the steering wheel 140. Thus, the driver of the vehicle 100 who depresses the button 130 (positive button 131 or the negative button 132) provided on the steering wheel 140 can always get a proper reaction for the depressing operation, whereby the driver can continuously depress the button 130 (the positive button 131 or the negative button 132) without getting bored. Since the driver of the vehicle 100 continuously depresses the button 130 (the positive button 131 or the negative button 132), the precision of the reason of depression can be enhanced, resulting in that more useful related information (feedback text data) can be provided.

The server 210 in the information providing center 200 can give feedback by providing (transmitting) the feedback text data that is the related information, even if the intention information is not inputted because the button 130 (the positive button 131 or the negative button 132) provided on the steering wheel 140 is not depressed by the driver of the vehicle 100. Thus, the frequency of operating the button 130 by the driver (occupant) can appropriately be increased, with the result that the number of the transmission information pieces transmitted by the depressing operation is increased. Thus, the precision of determining the reason of depression can be enhanced.

When the feedback text data is transmitted from the information providing center 200 as described above, simplified feedback text data can be provided as the related information, instead of the feedback text data showing detailed information. Specifically, in this case, simplified information such as "Like: X persons, Dislike: X persons" or "Like: X persons, Dislike: X persons. Your friend, XX: "Like"", can be displayed on a head-up display apparatus or a display mounted in a meter cluster as a notification unit, as the minimum necessary related information. With this configuration, the driver can quickly understand the information, and this configuration can solve troublesome work of interpreting the information. If the driver needs the detailed information described above, it is obvious that the driver can obtain such detailed information by depressing the button 130 in a predetermined manner, for example.

When the feedback text data is provided, it can be configured such that an indicator indicating that the feedback text data is provided is firstly turned on, and then, the driver depresses the button 130 in the predetermined manner, according to need, to display the detailed information, instead of displaying that the text data is provided on the display device provided in the vehicle 100 as the display unit, just after the text data is provided. In this case, the information tailored to the driver (occupant) can be provided in a state in which the feedback text data is provided when the vehicle 100 passes the position where the correspondence data is present. Thus, this configuration is preferable.

(D) Supplement of Reason of Input of Intention Information (Reason of Depression)

As described above, the intention information inputted by the driver's depressing operation of the button 130, i.e., the positive button 131 (like button 131) or the negative button 132 (dislike button 132) is the information generated only by the simple depressing operation of the button 130 (the target buttons 131 and 132), and it is only the 1-bit information indicating that the button 130 (the target buttons 131 and 132) is depressed. When the intention information is supplied to the information providing center 200, the server 210 can understand that the driver (occupant) of the vehicle 100 approves (likes) or rejects (dislikes) some condition, but cannot recognize the specific condition that is approved or rejected. Specifically, the intention information provided from the vehicle 100 lacks the information indicating the reason (intention) why the driver inputs the intention information by depressing the button 130 (the target buttons 131 and 132).

On the other hand, when the driver inputs the intention information by depressing the button 130 (the positive button 131 or the negative button 132) provided on the steering wheel 140, the related information based upon the reason (reason of depression) why the driver (occupant) of the other vehicle 100 transmits the intention information around the current position of the vehicle 100 is provided in the feedback given from the information providing center 200, for example. Accordingly, it is necessary that the server 210 appropriately supplements the reason of input (reason of depression) that lacks in the acquired intention information, and precisely keeps the reason of depression (more specifically, the determined reason of depression or the supposed reason of depression) constructing the database accumulated and stored in the information storage section 214, in order to provide useful related information.

(a) Supposition of Reason of Depression by Server 210

As described above, it is necessary that the database corresponding to the position information (coordinate) is constructed based upon the transmission information transmitted from the vehicle 100, when the correspondence data corresponding to the depressing operation of the positive button 131 or the negative button 132 by the driver of the vehicle 100 is not present, i.e., when the database corresponding to the coordinate (place) indicated by the position information is not yet present, for example. In this case, the transmission information includes the intention information, but does not include the information indicating the reason of depression. Therefore, it is necessary that the server 210 in the information providing center 200 constructs the database by supposing the reason (reason of depression) why the intention information is inputted with a certain extent of certainty.

Figure 12:
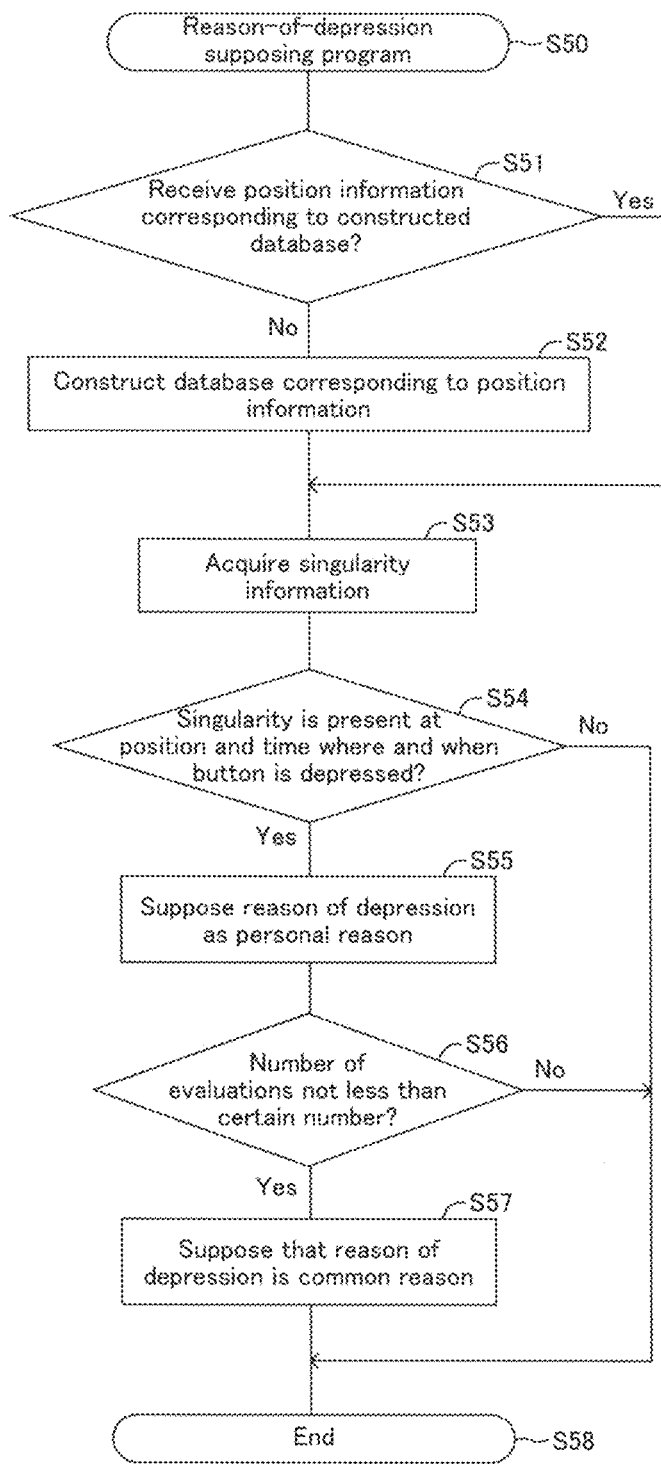
FIG. 12 is a flowchart illustrating a reason-of-depression supposing program executed by the server in the information providing center illustrated in FIG. 4 for supposing a reason why the positive button or the negative button in the vehicle is depressed.

Therefore, the server 210 executes a reason-of-depression supposing program illustrated in FIG. 12 in cooperation with the information management server 212 and the information storage section 214. The reason-of-depression supposing program will specifically be described below.

When the server 210 receives the transmission information from the vehicle 100, i.e., when the button 130 (specifically, the positive button 131 or the negative button 132) provided on the steering wheel 140 is depressed by the driver of the vehicle 100, the server 210 starts to execute the reason-of-depression supposing program in step S50 in the flowchart illustrated in FIG. 12. In next step S51, the server 210 determines whether or not the database corresponding to the position information (coordinate) included in the transmission information received on the predetermined storage position of the information storage section 214 is constructed and stored, in other words, the server 210 determines whether or not the position information corresponding to the constructed database is received, in cooperation with the information management server 212. The server 210 searches in the information storage section 214 in cooperation with the information management server 213 by using the position information, and if the database corresponding to the predetermined storage position of the information storage section 214 is not constructed, the server 210 determines as "No", and proceeds to step S52. If the database corresponding to the predetermined storage position of the information storage section 214 is constructed, the server 210 determines as "Yes", and proceeds to step S53.

In step S52, the server 210 constructs the database, illustrated in FIG. 14, according to the user account on the predetermined storage position of the information storage section 214 based upon the intention information and the position information included in the transmission information, for example, in cooperation with the information management server 212, as described in (B) described above. When the database according to the user account is constructed in step S52, the information management server 212 firstly constructs the database for each of items including the coordinate indicated by the position information included in the transmission information, the time indicated by the time information, the type of the vehicle 100, the intention information, and the number of times of transmitting the intention information having a coordinate (position information) almost matching the coordinate. Specifically, in step S52, the items (supposed reason of depression) involved with the reason of depression is temporarily set based upon the reason set in the entire database illustrated in FIG. 8, until the reason of depression is supposed by the process of S54 and the process of each of the subsequent steps described later, for example.

In step S53, the server 210 searches in the information storage section 214 in cooperation with the information management server 212 to acquire facility information related to shops around the place (coordinate) indicated by the position information included in the transmission information and road information related to a shape (road width or right or left turn) of a road around the place (coordinate). The server 210 also acquires weather information around the place (coordinate) indicated by the position information and fluctuating environment information such as a traffic condition (occurrence of a traffic jam or occurrence of accident) around the place (coordinate) from an external information center, not illustrated, via the network 400. After acquiring the facility information, the road information, and the fluctuating environment information (these information pieces are collectively referred to as singularity determining information below) as the environment information indicating the environment around the vehicle, the server 210 proceeds to step S54.

In step S54, the server 210 determines whether or not a singularity is present on the position (place), where the button 130 (the positive button 131 or the negative button 132) is depressed, indicated by the position information, and at the time, when the button 130 (the positive button 131 or the negative button 132) is depressed, indicated by the time information, by using the singularity determining information acquired in step S53. If there is a singularity such as a condition in which shops are located around the position (place) where the button 130 (the positive button 131 or the negative button 132) is depressed, a condition in which the width of the road around the position (place) is wide, so that the driver can easily drive, and a condition in which a traffic jam is solved at the time when the button 130 (the positive button 131 or the negative button 132) is depressed, the server 210 determines as "Yes", and proceeds to step S55. When no singularity is found on the position and at the time where and when the button 130 is depressed by using the singularity determining information, the server 210 determines as "No", and proceeds to step S58 where the server temporarily ends the execution of the reason-of-depression supposing program. After a lapse of a predetermined short time, the server 210 again starts to execute the same program in step S50. In this case, the server 210 sets that the reason of depression is unclear in the constructed database or sets the reason set to the entire database, in cooperation with the information management server 212.

In step S55, the server 210 firstly supposes that the reason why the intention information is inputted, i.e., why the driver depresses the button 130 (the positive button 131 or the negative button 132), is a driver's (occupant's) personal reason, based upon the singularity found in the determination process in step S54. Specifically, when the positive button 131 (the like button 131) is depressed plural times around a certain shop, for example, the server 210 supposes the reason of depression such that the driver (occupant) depresses the positive button 131 (like button 131) because the driver (occupant) gets near to his/her personal favorite shop. Alternatively, when the negative button 132 (dislike button 132) is depressed plural times on a certain point of a road, for example, the server 210 supposes the reason of depression such that this road is hard for the driver to drive due to the drive's personal driving experience. As described above, the server 210 supposes the reason of depression based upon an idea in which the found singularity is caused by a driver's personal circumstance, and sets this reason of depression (in other words, the server 210 forms a hypothesis). After supposing the reason of depression, the server 210 proceeds to step S56.

In step S56, the server 210 determines whether or not the number of times of the depression of the button 130 related to the singularity, in other words, the number of evaluations of the singularity, is a certain number or more, or determines whether the number of evaluations of the entire database illustrated in FIG. 8 is a certain number or more, by referring to the database corresponding to each user account (or a vehicle account) stored in the information storage section 215 for the singularity found in step S54, in cooperation with the information management server 212. If the number of evaluations is a certain number or more, the server 210 determines as "Yes", and proceeds to step S57, since the singularity found in step S54 is not caused by the personal circumstance, but this singularity is common to drivers of the other vehicles 100. If the number of evaluations is less than the certain number, the server 210 determines as "No", since the singularity found in step S54 is regarded to be caused by the personal circumstance. Therefore, the server 210 proceeds to step S58 to temporarily end the execution of the reason-of-depression supposing program. In this case, the server 210 sets the personal reason of depression, supposed in step S55, as the supposed reason of depression in the database constructed as described above, in cooperation with the information management server 212.

In step S57, the server 210 supposes that the reason why the intention information is inputted, i.e., the reason why the button 130 (the positive button 131 or the negative button 132) is depressed, is common to the drivers (occupants) of the plural vehicles 100, based upon the singularity found in the determination process in step S54. Specifically, when the certain number or more drivers (occupants) similarly depress the positive button 131 (like button 131) around a certain shop, the server 210 supposes the reason of depression such that the plural drivers (occupants) depress the positive button 131 (like button 131) since they get near to a popular shop. Alternatively, when the certain number or more drivers (occupants) similarly depress the negative button 132 (dislike button 132) on a certain point of a road, the server 210 supposes the reason of depression such that the plural drivers (occupants) depress the negative button 132 (dislike button 132) since this road has a narrow width, and is hard for the drivers to drive.

In this case, the server 210 supposes the reason of depression based upon the idea in which the found singularity is caused by the "place" common to the plural drivers (occupants), and sets this reason of depression (in other words, the server 210 forms a hypothesis). After supposing the reason of depression, the server 210 proceeds to step S58 to temporarily end the execution of the reason-of-depression supposing program. After a lapse of a predetermined short time, the server 210 again starts to execute the same program in step S50. In this case, the server 210 sets the common reason of depression supposed in step S57 as the supposed reason of depression in the database constructed as described above, in cooperation with the information management server 212.

The server 210 in the information providing center 200 can suppose the reason of depression with a certain extent of certainty from the intention information (1-bit information) from which the information indicating the reason of depression is completely missed, and sets this reason of depression, by executing the reason-of-depression supposing program. Therefore, the server 210 can appropriately suppose and supplement the reason of depression needed to provide useful information, for the intention information, which is the 1-bit information, inputted by the driver (occupant) of the vehicle 100. Thus, the server 210 can appropriately provide, as the feedback, very useful related information (such as the feedback text data) related to the intention information inputted by the driver (occupant) of the vehicle 100. Since the server 210 can appropriately provide the related information as the feedback as described above, the server 210 can allow the driver (occupant) to continuously input the intention information (i.e., to continuously depress the button 130), whereby the precision of supposing the reason of depression can be enhanced.

(b) Further Supposition and Determination of Reason of Depression by Using SNS

In a state in which the server 210 in the information providing center 200 determines the reason of depression as described above, the supposing precision might be poor, since the reason of depression is supposed by using the singularity determining information obtained beforehand. There may be the case in which the reason of depression cannot be supposed even by using the singularity determining information. In view of this, the information providing center 200 supposes or determines the reason of depression by using the closed SNS and/or open SNS in cooperation with the service providing center 500 in order to suppose the unclear reason of depression or determine the reason of depression more directly or in real time.

Figure 13:
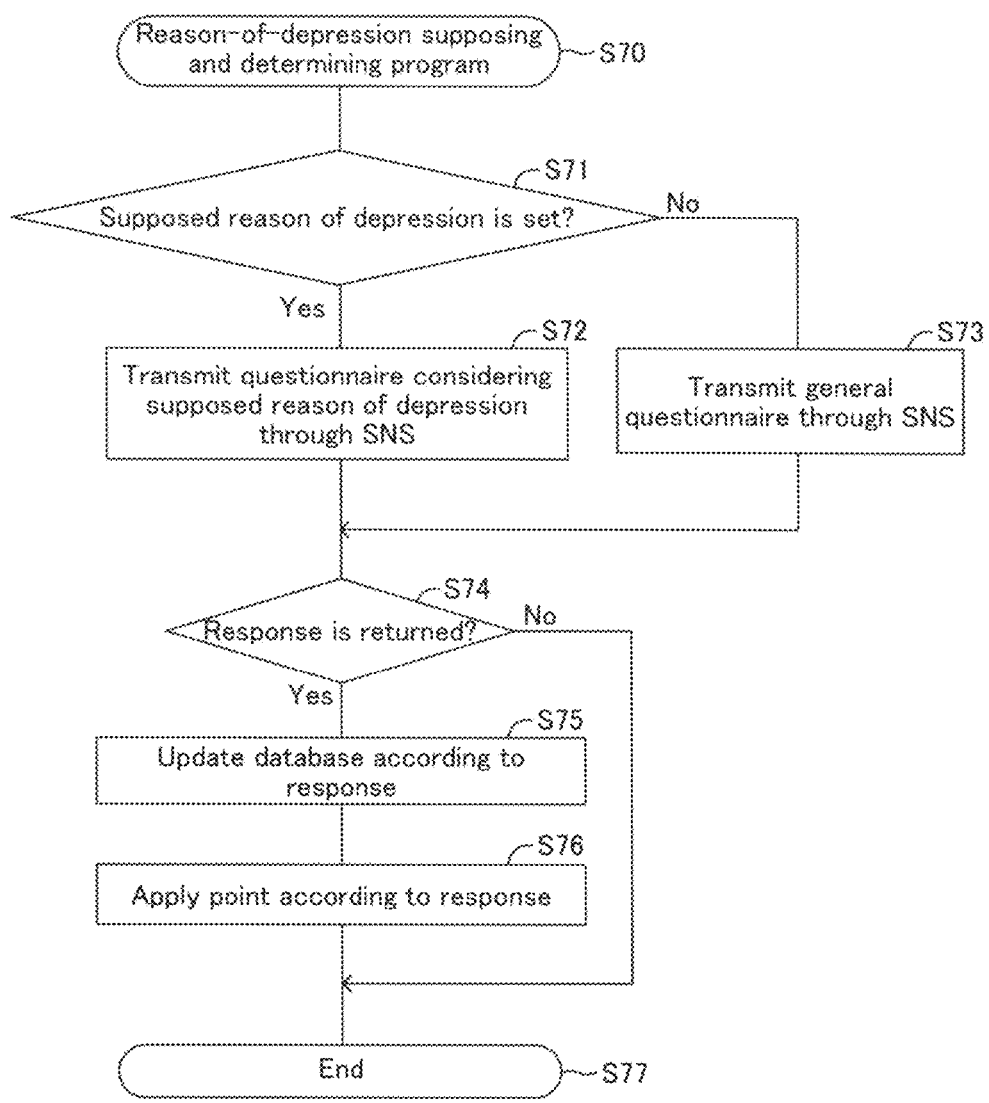
FIG. 13 is a flowchart illustrating a reason-of-depression supposing and determining program executed by the server in the information providing center illustrated in FIG. 4 and a server in the service providing center illustrated in FIG. 6 in cooperation with each other for supposing and determining the reason why the positive button or the negative button in the vehicle is depressed from a response of the reason o the depression through an SNS.

Specifically described, the server 210 in the information providing center 200 executes a reason-of-depression supposing and determining program illustrated in FIG. 13 in cooperation with the server 510 in the service providing center 500. The reason-of-depression supposing and determining program will be described in detail below.

When the server 210 receives the transmission information from the vehicle 100, i.e., when the button 130 (specifically, the positive button 131 or the negative button 132) provided on the steering wheel 140 is depressed by the driver of the vehicle 100, the server 210 starts to execute the reason-of-depression supposing and determining program in step S70 in the flowchart illustrated in FIG. 13.

In next step S71, the server 210 extracts the database related to the vehicle account information or the user account information included in the transmission information, out of the databases (e.g., the database illustrated in FIG. 14) constructed and stored at the predetermined storage position of the information storage section 214, in cooperation with the information management server 212, and determines whether the supposed reason of depression of this database is set or not. When the supposed reason of depression of the extracted database is supposed and set as described above, the server 210 determines as "Yes", and proceeds to step S72. When the supposed reason of depression of the extracted database is not set, the server 210 determines as "No", and proceeds to step S73.

Figure 15:
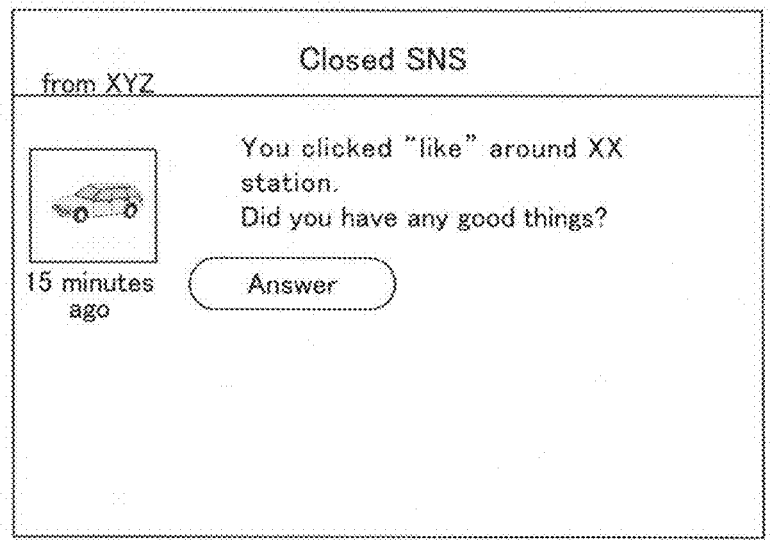
FIG. 15 is a view for describing intention information in a message form presented by an SNS that is a closed community.

In step S72, the server 210 transmits a questionnaire, including a response form, for confirming whether the reason of depression currently supposed on the database is correct or not, to the driver (occupant) of the vehicle 100 transmitting the transmission information through the closed SNS. Specifically described, in order to utilize the closed SNS, the server 210 acquires the vehicle account information stored in the user information storage section 215 from the user information management server 213. Thereafter, the server 210 can log in to the service providing center 500 by using this vehicle account information. With this, the server 210 can transmit a message as if the vehicle 100 itself tweets the message. Accordingly, the server 210 transmits the questionnaire, including a phrase that the button 130 (the positive button 131 or the negative button 132) is depressed (the intention information is inputted) and options including the supposed reason of depression, in a message form to the driver (occupant) from the vehicle 100 (in FIG. 15, "XYZ") via the closed SNS, in cooperation with the server 510 in the service providing center 500, as schematically illustrated in FIG. 15.

Figure 16:
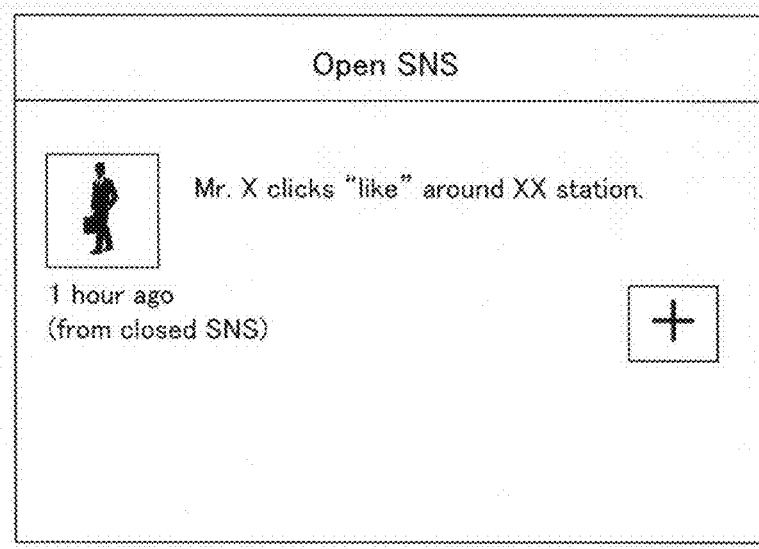
FIG. 16 is a view for describing intention information in a message form presented by an SNS that is an open community.

The server 510 in the service providing center 500 acquires the user account information related to the vehicle account information from the contractor information storage section 515, and can log in to the open SNS by using this user account information, in cooperation with the contractor information management server 513. Thus, the server 210 in the information providing center 200 transmits that the button (the like button 131 or the dislike button 132) is depressed in a message form from the driver (user) to a third party, including his/her friends, via the server 510, as schematically illustrated in FIG. 16. After transmitting the questionnaire, the server proceeds to step S74.

In step S73, the server 210 transmits a general questionnaire, inquiring the reason of depression, to the driver (occupant) of the vehicle 100 transmitting the transmission information through the closed SNS. In this case, the server 210 can transmit the message as if the vehicle 100 itself tweets the message, as in the process in step S72. The server 210 transmits a questionnaire such as "You clicked like around XX station. Why?" in the message form from the vehicle 100 to the driver (occupant) via the closed SNS, in cooperation with the server 510 in the service providing center 500.

In this case, the server 510 in the service providing center 500 acquires the user account information related to the vehicle account information from the contractor information storage section 515, and can log in to the open SNS by using this user account information, in cooperation with the contractor information management server 513 and the contractor information storage section 515, as in the process in step S72. Thus, the server 210 in the information providing center 200 transmits that the button (the like button 131 or the dislike button 132) is depressed in a message form from the driver (user) to a third party including his/her friends via the server 510, as in FIG. 16. After transmitting the questionnaire, the server 210 proceeds to step S74.

Figure 17:
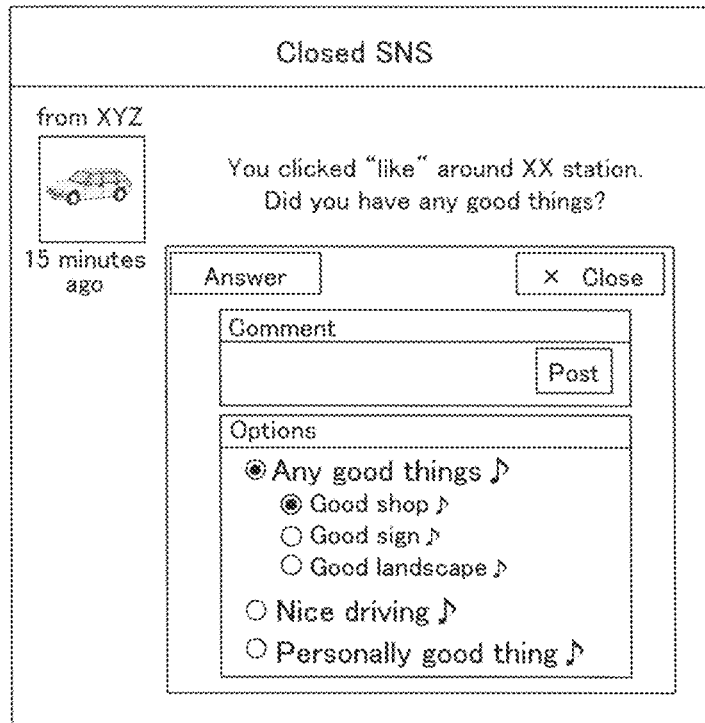
FIG. 17 is a view for describing a response form presented by an SNS that is a closed community.

In step S74, the server 210 determines whether the response to the questionnaire transmitted in the process in step S72 or in step S73 is received or not. Specifically described, when the questionnaire is transmitted through the closed SNS in step S72, the driver (occupant) of the vehicle 100 oneself can confirm the questionnaire with the portable information terminal 300 or a personal computer in his/her home by logging in to the service providing center 500 by means of his/her user account information, for example. In order to respond to the questionnaire, the driver (occupant) selects the reason why the button 130 (the positive button 131 or the negative button 132) is depressed from the options in the response form, including the supposed reason of depression, attached to the questionnaire, as schematically illustrated in FIG. 17.

After the driver (occupant) of the vehicle 100 answers the questionnaire as described above, the response is transmitted to the information providing center 200 via the network 400 by the server 510 in the service providing center 500. When the driver (occupant) of the vehicle 100 gives the response according to the response form, the server 210 determines as "Yes", and proceeds to step S75. When the driver (occupant) of the vehicle 100 does not give the response according to the response form, the server 210 determines as "No", and proceeds to step S77. The server 210 temporarily ends the execution of the reason-of-depression supposing and determining program in step S77. After a lapse of a predetermined short time, the serve 210 again starts to execute the same program in step S70.

The advantage of supposing or determining the reason of depression by utilizing the closed SNS and/or the open SNS will briefly be described. As described above, the closed SNS is a closed community, and the driver (occupant) can join the closed SNS by logging in with the vehicle account information of the vehicle 100 or the user account information. Therefore, the vehicle 100 can log in to the closed SNS by using the vehicle account information, and can transmit various information pieces on a predetermined feed. On the other hand, the driver (occupant) of the vehicle 100 can log in to the closed SNS with the user account information by using his/her portable information terminal 300 (e.g., smartphone or a tablet terminal) or a personal computer in his/her home. With this, the driver (occupant) can acquire various information pieces from the vehicle 100 or can share, on the predetermined feed, information with a driver (occupant) of other vehicle, a dealer, or a car manufacturer, who follows this feed.

There are functions, unique to the closed SNS (i.e., the closed community), in which the driver (occupant) responds to the intention information ("like" or "dislike") transmitted previously or the driver (occupant) can make an argument with the other user (driver or occupant). When the driver (occupant) uses these functions, the driver (occupant) can clarify the intention information that is the reason why he/she clicked "like", or he/she can actively communicate with the other user.

In the closed SNS, when the driver (occupant) transmits the intention information ("like" or "dislike") from the vehicle 100 by using the vehicle account information (more specifically, by depressing the positive button 131 (like button 131) or the negative button 132 (dislike button 132)), the service providing center 500 transmits the information related to the intention information, transmitted by using the vehicle account information, to the closed SNS via the information providing center 200 as described above. With this operation, when the driver (occupant) logs in to the closed SNS by using the user account information, the information, illustrated in FIG. 15, related to the intention information transmitted from the vehicle 100, is displayed on the feed of the SNS. The driver (occupant) can later refer to or make a comment to his/her intention information ("like" or "dislike") in accordance with the response form illustrated in FIG. 17 by confirming this feed. Since the information related to the intention information is displayed on the feed, the other driver (occupant) following the driver (occupant) can provide the information related to the intention information, whereby the transmission of the intention information from the vehicle 100 can become a trigger for making communication in the closed SNS. Such trigger can be also applied in the open SNS.

A driver (occupant) who does not use the SNS can also receive the related information acquired from the SNS as the feedback as described above. Therefore, depressing the button 130 (positive button 131 (like button 131) or the negative button 132 (dislike button 132)) develops incentive to help information collection.

In step S75, the server 210 updates the supposed reason of depression and the determined reason of depression of the database according to the reason of depression acquired by the response form. When the driver (occupant) of the vehicle 100 makes a response indicating that the supposed reason of depression illustrated in the response form is correct (true), for example, the tendency of the reason why the button 130 (more specifically, the positive button 131 (like button 131) or the negative button 132 (dislike button 132)) is depressed on a certain point can be determined. Therefore, the server 210 updates the database illustrated in FIG. 14 by changing the supposed reason of depression to the determined reason of depression, for example. Alternatively, when the driver (occupant) of the vehicle 100 gives a comment to the reason of depression in a state in which the reason of depression cannot be supposed, for example, the server 210 supposes the reason why the button 130 (more specifically, the positive button 131 (like button 131) or the negative button 132 (dislike button 132)) is depressed on a certain point as the commented reason, and updates the database illustrated in FIG. 14. After updating the reason of depression of the database in accordance with the response from the driver (occupant) of the vehicle 100 as described above, the server 210 proceeds to step S76.

Figure 18:
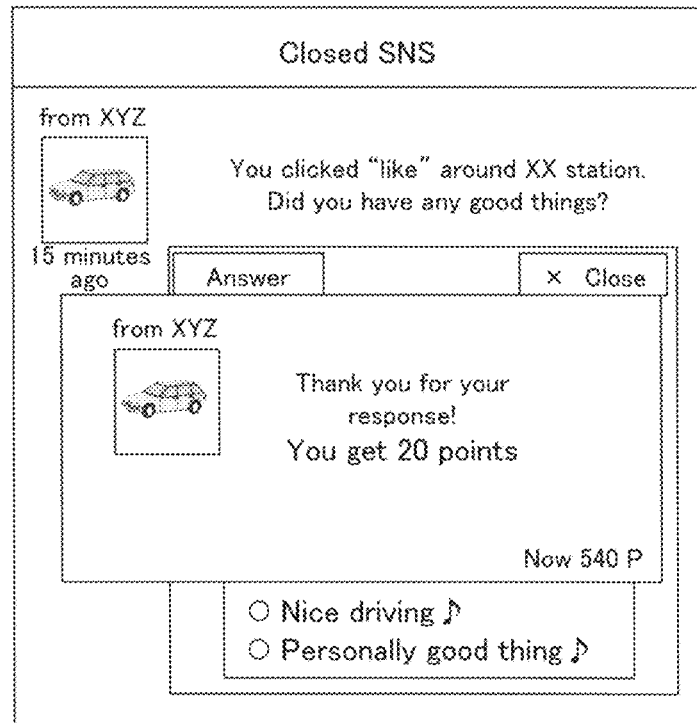
FIG. 18 is a view for describing a point applied to the response.

In step S76, the server 210 gives a point to the driver (occupant), i.e., the user, who responds to the questionnaire, as schematically illustrated in FIG. 18. In this case, the server 210 acquires the user account information of the user from the user information storage section 215 in cooperation with the user information management server 213. The server 210 then logs in to a point management server, which is connected so as to be capable of making communication via the network and is not illustrated, by using the acquired user account information, and accumulates and stores point information, indicating the given point, into the database constructed for each user in the point management server. Since the driver (occupant) of the vehicle 100 can get a point by responding to the questionnaire, the incentive of the driver (occupant) of the vehicle 100 can be increased. After giving a point to the driver (occupant), i.e., the user, who responds to the questionnaire, the server 210 proceeds to step S77 to temporarily end the execution of the reason-of-depression supposing and determining program. After a lapse of a predetermined short time, the server 210 again starts to execute the same program in step S70.

When the server 210 in the information providing center 200 and the server 510 in the service providing center 500 execute the reason-of-depression supposing and determining program in cooperation with each other, they can allow the driver (occupant), actually depressing the button 130 (the positive button 131 and the negative button 132), to confirm the reason of depression, which can be supposed to some extent by the server 210, through the SNS. Accordingly, the reason of depression can clearly be determined. In the case where the server 210 cannot suppose the reason of depression, the server 210 can make an inquiry to a driver (occupant) who actually depresses the button 130 (the positive button 131 and the negative button 132) about the reason of depression through the SNS. Accordingly, the reason of depression can precisely be supposed (determined).

Consequently, the server 210 can appropriately supplement the reason of depression, which is needed to provide useful information, for the intention information that is 1-bit information inputted by the driver (occupant) of the vehicle 100. Thus, the server 210 can appropriately provide very useful related information (such as the feedback text data) related to the intention information inputted by the driver (occupant) of the vehicle 100, as the feedback. On the other hand, the driver (occupant) can obtain very useful information for clarifying a true improvement of the condition by widely collecting the intention information rejecting the condition and its reason of depression through the SNS. For example, a car manufacturer can reflect the point to be improved for a manufacture of a vehicle, and with this, the car manufacturer can contribute to creation of society.

The server 510 in the service providing center 500 can transmit that the button (the like button 131 or the dislike button 132) is depressed in the form of a message to a third party including the driver's friend from the driver (user), to the open SNS as schematically illustrated in FIG. 16 as described above. Therefore, it is possible to collect a detailed comment by a third party, for the operation of depressing the button 130 (the like button 131 or the dislike button 132) by the driver (user) on a certain point.

According to this configuration, in the case where the driver (user) does not make a response (or cannot make a response) about the reason why the driver (user) depresses the button, the server 210 in the information providing center 200 can collect opinions, such as "it is supposed that "the dislike button" is depressed since the road on the corresponding point has a large step", "it is supposed that the "dislike button" is depressed because a driver aboard a vehicle of a certain model receives a long uncomfortable vibration when passing though the corresponding point", or "it is supposed that a driver depresses the "like button" when passing though this point later because the large step on the corresponding point is just repaired", as the opinion of the third party, in cooperation with the server 510 in the service providing center 500, as described above. Therefore, the true opinion of rejecting the condition is easy to be obtained. Accordingly, a car manufacturer can easily recognize silent majority, which cannot be obtained in a general counseling center, about a manufacture of a vehicle favored by a driver (user) or a point that should be improved. On the contrary, the driver (user) can feel that he/she is actually involved in manufacturing the vehicle, since a vehicle on which his/her opinion or favor is reflected is possibly developed.

Figure 19:
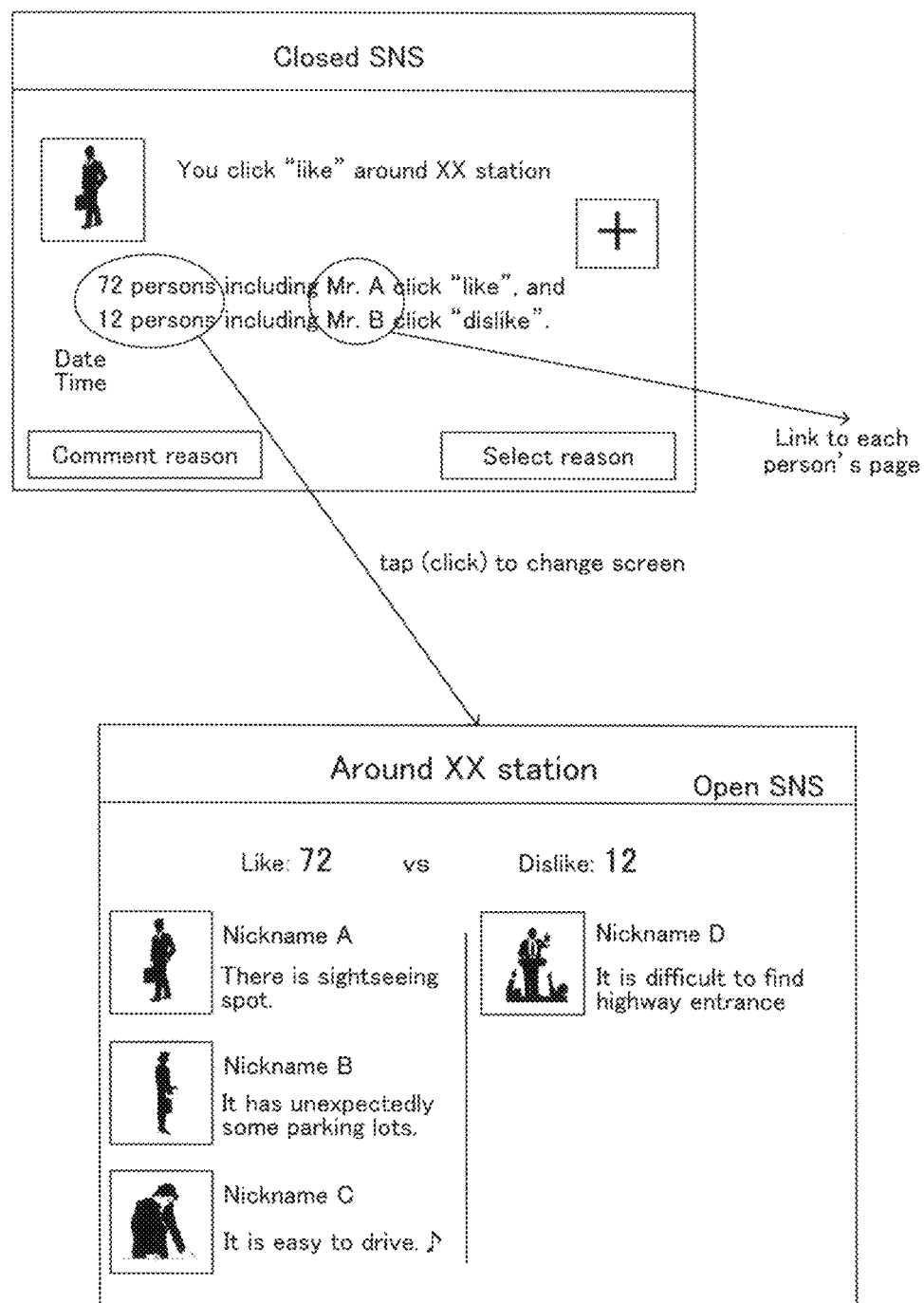
FIG. 19 is a view for describing a screen transition from an SNS that is a closed community to an SNS that is an open community.

As described above, the server 510 in the service providing center 500 can transmit that the button 130 (the like button 131 or the dislike button 132) is depressed by the driver of the vehicle 100 to the open SNS. With this, the driver (occupant) of the vehicle 100 can confirm his/her friend's opinion by utilizing a group function of the SNS among users who log in and join the open SNS. Specifically described, when the driver (occupant) of the vehicle 100 joins the closed SNS to confirm the intention information of the other driver (occupant), for example, the number of "likes" or "dislikes" on a certain point can be displayed based upon each database constructed at the predetermined storage position of the information storage section 214, as illustrated in FIG. 19. In this case, when the driver (occupant) of the vehicle 100 logs in to the open SNS to confirm the detailed comment, the driver (occupant) can confirm a comment of his/her friend through the group function. As described above, friends are gathered by utilizing the open SNS, so that more active communication is generated for the reason of depression on a certain point, for example, and more profound discussion can be made.

(E) Real-Time Use of Intention Information

As described above, the driver of the vehicle 100 can easily depress the button 130 (more specifically, the positive button 131 or the negative button 132) provided on the steering wheel 140 at any time. The driver can provide useful and correct information to the other vehicle 100 by utilizing such satisfactory operability (real-time operability).

For example, it is supposed that a traffic jam occurs. Under such condition, the driver of the vehicle 100 cannot clearly recognize an end of the traffic jam (an end point of the traffic jam), so that he/she is difficult to smoothly accelerate the vehicle 100 at the end of the traffic jam. Accordingly, the traffic jam might not quickly be solved. Recently, traffic jam information (distance of the traffic jam, or a time taken for the vehicle to pass through the traffic jam) is announced. However, the traffic jam changes from hour to hour, so that the provided traffic jam information might be different from the actual traffic jam. This also prevents the traffic jam from quickly being solved.

In this case, if the vehicle 100 includes the information inputting apparatus, the driver depresses the button 130 (more specifically, the positive button 131 (like button 131)) provided on the steering wheel 140 when the driver passes through the traffic jam. The intention information pieces are collected on the server 210 in the information providing center 200 from many vehicles 100, whereby the server 210 can correctly recognize the position of the end of the traffic jam based upon the position information transmitted together with the intention information. Accordingly, the server 210 can feed back the position of the end of the traffic jam to the other vehicle 100, which still stops due to the traffic jam, as the related information. Thus, the driver (occupant) of the other vehicle 100 can recognize the correct position of the end of the traffic jam, whereby frustration can effectively be prevented, for example.

When the vehicle 100 cannot move in a traffic jam, the driver of the vehicle 100 feels frustrated. In this case, the drivers of the vehicles in the traffic jam can play a network game (e.g., a quiz game) by utilizing the button 130 (the positive button 131 or the negative button 132) provided on the steering wheel 140, for example. In this case, the server 210 in the information providing center 200 groups the neighboring vehicles 100, and feeds back the percentage of the correct answers in each group as the related information. Thus, a sense of unity is generated among the neighboring vehicles 100. Consequently, it is possible to prevent unreasonable interruption, and to effectively encourage compassionate drive. Since this process is effective for distracting the drivers of the vehicles in the traffic jam, the frustration of the drivers can effectively be solved.

As can be understood from the above description, in the embodiment described above, the button 130 (the positive button 131 and the negative button 132) is provided on the steering wheel 140. Accordingly, the driver of the vehicle 100 can very easily (without any load) depress the positive button 131 or the negative button 132 at any time, thereby being capable of inputting intention information of approving (satisfying) a condition in a real space, which is involved with the driver aboard the vehicle and which changes from hour to hour as the vehicle 100 is moving, or intention information of disapproving (dissatisfying) a condition in a real space, which is involved with the driver aboard the vehicle and which changes from hour to hour as the vehicle 100 is moving, to the DCM 150 that can communicate with the information providing center 200. Accordingly, the intention information, which is a minimum of 1-bit information indicating the intention of the approval or the rejection, of the driver who drives the vehicle 100 can appropriately be outputted to the outside.

According to the present embodiment, the database can be constructed by associating the transmission information transmitted from the vehicle 100, such as the position information, the time information, the intention information, and the reason of depression, with one another. Accordingly, map data based upon the constructed database can easily be generated, whereby information can be visualized. Consequently, the use of the intention information can effectively be encouraged.

According to the present embodiment, after the intention information is inputted by the button 130 (the positive button 131 or the negative button 132) provided on the steering wheel 140 being depressed, the server 210 in the information providing center 200 can provide (transmit) the feedback text data that is the related information, in other words, the server 210 can appropriately give the feedback. Accordingly, the driver of the vehicle 100 can continuously depress the button 130 (the positive button 131 or the negative button 132) without getting bored, whereby the precision of the reason of depression can be enhanced. Consequently, more useful related information (the feedback text data) can be provided.

According to the present embodiment, the driver (occupant) actually depressing the button 130 (the positive button 131 and the negative button 132) can confirm the reason of depression that can be supposed by the server 210 to some extent through the SNS, whereby the reason of depression can clearly be determined. When the server 210 cannot determine the reason of depression, the server 210 can make an inquiry to the driver (occupant) actually depressing the button 130 (the positive button 131 and the negative button 132) about the reason of depression through the SNS. Accordingly, the server 210 can suppose (determine) the reason of depression with precision.

With this operation, the server 210 can appropriately supplement the reason of depression, which is needed to provide useful information, for the intention information, which is 1-bit information, inputted by the driver (occupant) of the vehicle 100, thereby being capable of appropriately providing useful related information (such as the feedback text data) as the feedback. The driver (occupant) can obtain very useful information for clarifying a true point to be improved by collecting a lot of intention information pieces of rejecting the condition and their reason of depression from the SNS. Accordingly, a car manufacturer can reflect the point to be improved for a manufacture of a vehicle, and with this, the car manufacturer can contribute to creation of society and towns.

Upon embodying the present invention, the invention is not limited to the above embodiment, but various modifications are possible without departing from the scope of the present invention.

For example, in the present embodiment, the DCM 150 in the vehicle 100 transmits the transmission information including the inputted intention information to the information providing center 200 via the button 130 (the positive button 131 or the negative button 132) that is the input unit. However, the transmission information including the intention information can be transmitted to the information providing center 200 by utilizing the external communication control section 301 of the portable information terminal 300 paired by the short-range communication control apparatus 160.

In this case, the button 130 (the positive button 131 and the negative button 132) supplies the intention information to the short-range communication control apparatus 160 via the CAN communication line 120. The short-range communication control apparatus 160 transmits the supplied intention information, and the position information and the time information transmitted from the navigation apparatus 170 to the paired portable information terminal 300 with short-range radio communication. The portable information terminal 300 transmits the transmitted various information pieces to the information providing center 200 connected to the network 400 via the external communication control section 301 and a relay station. Accordingly, in this case, the transmission information including the intention information can also be transmitted from the vehicle 100 via the network 400, whereby the effect same as that of the above-mentioned embodiment can be expected.

In the embodiment described above, when the driver (occupant) of the vehicle 100 depresses the button 130 (the positive button 131 or the negative button 132), the DCM 150 transmits the transmission information including the intention information to the information providing center 200 by using the mobile phone network in almost real time. However, it can be configured as described below. Specifically, the intention information inputted by the depression of the button 130 (the positive button 131 or the negative button 132) is temporarily stored as the transmission information. When the vehicle is on the place (e.g., the driver's home or company) where a broadband line is built, the stored transmission information including the intention information is outputted with Wi-Fi (registered trademark). Alternatively, if the vehicle 100 is an EV or PHV, the stored transmission information including the intention information can be outputted via an electric power line communication (so-called PLC) upon charging or a broad line, for example. In this case, usability is slightly deteriorated since the real-time feedback is not given. However, a communication cost or communication load can be reduced, which is preferable.

In the embodiment described above, the button 130 (the positive button 131 (like button 131) and the negative button 132 (dislike button 132)) is provided on the steering wheel 140, and the driver of the vehicle depresses the button 130 as a general rule. In this case, the button 130 (the positive button 131 (like button 131) and the negative button 132 (dislike button 132)) may be arranged near each seat excluding the driver's seat of the vehicle 100. Specifically, it is preferable that the button 130 (the positive button 131 (like button 131) and the negative button 132 (dislike button 132)) is displayed on the touch-panel-type liquid-crystal display of the navigation apparatus 170, the touch-panel-type liquid-crystal display 304 of the paired information terminal apparatus 300, or a display of an audio apparatus. In this case, the button 130 (the positive button 131 (like button 131) and the negative button 132 (dislike button 132)) is necessarily displayed as a dedicated button with an execution of a predetermined application when the occupant depresses the button 130, in order that the button 130 can always be operated by the occupant.

With this configuration, the occupant in the vehicle 100 can input the intention information by depressing the button 130 (the positive button 131 (like button 131) and the negative button 132 (dislike button 132)) at any time. In this case, in order to identify the inputted intention information, it is preferable that the occupants other than the driver set their user accounts to the DCM 150 in association with the button 130 (the positive button 131 (like button 131) and the negative button 132 (dislike button 132)), which is depressed by the corresponding other occupants by using the touch-panel-type liquid-crystal display of the navigation apparatus 170 or the paired information terminal apparatus 300.

In the above embodiment, the vehicle 100 can directly communicate with the information providing center 200 via the network 400 by using the DCM 150. In this case, the transmission information transmitted from the DCM 150 includes the vehicle account information and the user account information that are related to each other. Therefore, it is obvious that the vehicle 100 can log in to the closed SNS provided by the service providing center 500 to indirectly communicate with the information providing center 200 via the service providing center 500. In this case, the transmission information including at least either one of the vehicle account information and the user account information is transmitted, whereby the process of logging in to the service providing center 500 and the information providing center 200 can be skipped. Accordingly, the driver (occupant) can easily join the closed SNS or the open SNS.

In the above embodiment, the vehicle 100 can access (log in) to the information providing center 200 and transmit the intention information via the network 400. In this case, the vehicle 100 may connect only to the open SNS without being connected to the network 400 for the connection to the information providing center 200 and the service providing center 500 under the closed environment, whereby the vehicle 100 can directly transmit the intention information ("like" or "dislike") or give the related information based upon the other's intention information ("like" or "dislike") relative to the transmission of this intention information as a feedback. In this case, the transmission information including the user account information used for logging in to the open SNS is transmitted, whereby the process of logging in to the open SNS can be skipped. Accordingly, the driver (occupant) can easily join the open SNS.

In the above embodiment, the information providing apparatus is provided in the information providing center 200. However, a part of the function of the information providing apparatus, e.g., the function of giving a feedback, can be provided to the vehicle 100. In this case, usability is slightly deteriorated, since the related information provided as the feedback is difficult to be updated in real time. However, the feedback can very quickly be given for the depressing operation of the button 130, thus preferable.

The invention claimed is:
1. An information inputting apparatus comprising:
an input unit, which is provided in a compartment of a vehicle and is inputted by an occupant of the vehicle; and
circuitry mounted on the vehicle, wherein
the input unit is used by the occupant to input intention information indicating at least an opinion or feeling of approval of a condition involved with the occupant aboard the vehicle in a real space, which includes at least one of a surrounding condition, a road condition, a driving condition of the vehicle, and a health condition of the occupant, when the occupant approves the condition, and an opinion or feeling of rejection of the condition when the occupant rejects the condition, and the circuitry is configured to:
- transmit the intention information input by the occupant with the input unit to an information providing center outside of the vehicle,
- when the occupant inputs with the input unit a reason why the occupant had the opinion or feeling of approval or of rejection of the condition, transmit the reason to the information providing center, and
- when the information providing center is unable to determine the reason, receive feedback information from the information providing center to prompt the occupant to clarify the reason why the occupant had the opinion or feeling of approval or of rejection of the condition.

2. The information inputting apparatus according to claim 1, wherein
the input unit is connected to an on-vehicle device, which can be mounted on the vehicle, so as to make communication, and
the input unit supplies the intention information to the on-vehicle device according to an input operation by the occupant.

3. The information inputting apparatus according to claim 2, wherein
the on-vehicle device that can be mounted on the vehicle includes the circuitry that includes communication circuitry that is configured to communicate with the information providing center outside of the vehicle, and to transmit the intention information, which is supplied according to the operation on the input unit by the occupant, to the information providing center outside of the vehicle.

4. The information inputting apparatus according to claim 3, wherein
the communication circuitry in the on-vehicle device is configured to transmit condition information, which is related to the condition involved with the occupant aboard the vehicle, to the information providing center outside of the vehicle in association with the intention information, when the occupant inputs the intention information via the input unit.

5. The information inputting apparatus according to claim 4, wherein
the condition information is at least one of current position information indicating a current position of the vehicle when the occupant inputs the intention information via the input unit and time information indicating a time when the Occupant inputs the intention information.

6. The information inputting apparatus according to claim 3, wherein
the communication circuitry in the on-vehicle device is configured to transmit at least one of identification information for identifying the vehicle and identification information for identifying the occupant to the information providing center outside of the vehicle in association with the intention information, when the occupant inputs the intention information via the input unit.

7. The information inputting apparatus according to claim 6, wherein
the communication circuitry in the on-vehicle device is configured to communicate with the information providing center outside of the vehicle by logging in to a predetermined network service, and
the communication circuitry is configured to transmit the identification information for identifying the occupant to the information providing center outside of the vehicle in association with the intention information, when logged in the predetermined network service.

8. The information inputting apparatus according to claim 1, wherein
the occupant is at least a driver of the vehicle, and
the input unit is provided at least on a portion near a steering wheel operated by the driver.

9. The information inputting apparatus according to claim 8, wherein
the input unit is provided at a position where the driver can make an input operation while gripping the steering wheel.

10. The information inputting apparatus according to claim 1, wherein
the input unit is at least any one of a button depressed by the occupant, a voice input unit to which a voice of the occupant is inputted, and an image recognition unit that recognizes an expression of a face of the occupant as an image.

11. The information inputting apparatus according to claim 3, further comprising:
a notification unit, wherein
the circuitry is configured to acquire related information related to an input of the intention information by the occupant via the input unit from the information providing center outside of the vehicle via the communication circuitry in the on-vehicle device, and the notification unit notifies the occupant of the acquired related information.

12. The information inputting apparatus according to claim 11, wherein
the related information is based upon intention information inputted by an occupant of another vehicle for the condition when the occupant inputs the intention information via the input unit.

13. The information inputting apparatus according to claim 12, wherein
the related information is information related to a number of intention information pieces inputted by the occupant of the other vehicle, or information related to the intention information inputted by the occupant of the other vehicle.

14. The information inputting apparatus according to claim 11, wherein
the related information is acquired from the information providing center outside of the vehicle through a predetermined network service that can be used by the occupant.

15. An information providing apparatus comprising:
circuitry configured to:
- collect information pieces supplied from plural vehicles,
- provide various information pieces related to the information pieces collected by the circuitry to at least an occupant of each of the vehicles,
- collect intention information, which is inputted by the occupant and indicates at least an opinion or feeling of approval of a condition involved with the occupant aboard the vehicle in a real space, which includes at least one of a surrounding condition, a road condition, a driving condition of the vehicle, and a health condition of the occupant, when the occupant approves the condition, and an opinion or feeling of rejection of the condition when the occupant rejects the condition, from the plural vehicles, determine a reason why the occupant had the opinion or feeling of approval or of rejection of the condition, and when the circuitry is unable to determine the reason, provide feedback information to prompt the occupant to clarify the reason why the occupant had the opinion or feeling of approval or of rejection of the condition.

16. The information providing apparatus according to claim 15, wherein
when the circuitry collects the intention information from one vehicle out of the plural vehicles, the circuitry is configured to provide information based upon intention information collected from other plural vehicles out of the plural vehicles to an occupant of the one vehicle.

17. The information providing apparatus according to claim 16, wherein
the information provided by the circuitry to the occupant of the one vehicle is information related to a number of intention information pieces collected from the other plural vehicles by the circuitry, or information related to the intention information collected from the other plural vehicles by the circuitry.

18. The information providing apparatus according to claim 16, wherein
the circuitry is configured to provide information based upon intention information, which is collected from a vehicle of an occupant who has a predetermined relationship to the occupant of the one vehicle, out of intention information pieces collected from the plural vehicles by the circuitry, to the occupant of the one vehicle.

19. The information providing apparatus according to claim 15, wherein
when one vehicle out of the plural vehicles from which the circuitry collects the intention information pieces is on a specific position, the circuitry is configured to provide information based upon intention information collected from other plural vehicles out of the plural vehicles to the occupant of the one vehicle.

20. The information providing apparatus according to claim 15, wherein
the circuitry is configured to:
accumulate plural intention information pieces collected from the plural vehicles by the circuitry so as to be retrievable,
supplement a reason why the intention information collected by the circuitry is inputted and supplied from the vehicle, and
accumulate the reason, which is supplemented by the circuitry, so as to be retrievable in association with the intention information collected by the circuitry.

21. The information providing apparatus according to claim 20, wherein
the circuitry is configured to accumulate the acquired intention information, and position information indicating a position of the vehicle when the intention information is inputted and time information indicating a time when the intention information is inputted, so as to be retrievable, the position information and the time information being associated with the acquired intention information, and
the circuitry is configured to supplement the reason why the intention information collected by the circuitry is supplied from the vehicle based upon the plural intention information pieces accumulated so as to be retrievable in the circuitry, plural position information pieces, and time information pieces accumulated in association with each of the plural intention information pieces, and environment information indicating an environment around the vehicle indicated by the position information and the time information.

22. The information providing apparatus according to claim 20, wherein
the circuitry is configured to present a response form encouraging the occupant of the vehicle to make a response about a reason why the intention information collected by the circuitry is supplied from the vehicle through a predetermined network service that can be used by the occupant of the vehicle, and to supplement the reason why the intention information collected by the circuitry is supplied from the vehicle based upon the response according to the response form.

23. The information providing apparatus according to claim 22, wherein
the circuitry is configured to:
suppose the reason why the intention information collected by the circuitry is supplied from the vehicle based upon the plural intention information pieces accumulated in the circuitry,
present the supposed reason to the occupant through the predetermined network service as well as present a response form encouraging the occupant to make a response as to whether the supposed reason is true or not, and
supplement the reason why the intention information collected by the circuitry is supplied from the vehicle based upon the response in accordance with the response form.

24. The information providing apparatus according to claim 23, wherein
the predetermined network service is a social networking service of a closed community that the occupant of the vehicle joins.

25. The information providing apparatus according to claim 22, wherein
the circuitry is configured to present to the occupant plural intention information pieces from an occupant of another vehicle corresponding to the intention information collected by the circuitry, as well as a response form encouraging the occupant to make a response about the reason why the intention information is supplied from the vehicle, and to supplement the reason why the intention information collected by the circuitry is supplied from the vehicle based upon the response in accordance with the response form.

26. The information providing apparatus according to claim 25, wherein
the predetermined network service is a social networking service of an open community that persons other than an occupant of a vehicle join.

27. The information providing apparatus according to claim 26, wherein
the plural intention information pieces from the occupant of the other vehicle presented through the social networking service, of an open community is presented with a nickname of the occupant of the other vehicle.

28. The information providing apparatus according to claim 22, wherein
the circuitry is configured to apply a predetermined point to the response, when the response is made in accordance with the response form presented by the circuitry.

29. An information providing system comprising:
an information inputting apparatus including an input unit provided in a compartment of a vehicle and operated by an occupant of the vehicle; and
an information providing apparatus including circuitry configured to collect information pieces supplied from plural vehicles including the information inputting apparatus, and to provide various information pieces related to the collected information pieces to at least an occupant of each of the vehicles, wherein
the input unit in the information inputting apparatus is used by the occupant to input intention information indicating at least an opinion or feeling of approval of a condition involved with the occupant aboard the vehicle in a real space, which includes at least one of a surrounding condition, a road condition, a driving condition of the vehicle, and a health condition of the occupant, when the occupant approves the condition, and an opinion or feeling of rejection of the condition when the occupant rejects the condition,
the circuitry in the information providing apparatus is configured to collect intention information, which is inputted via the input unit in the information inputting apparatus, from the plural vehicles, and
the circuitry in the information providing apparatus is configured to:
accumulate plural intention information pieces collected from the plural vehicles by the circuitry so as to be retrievable,
supplement a reason why the intention information collected by the circuitry is supplied from the vehicle, and
when the circuitry is unable to determine the reason, provide feedback information to prompt the occupant to clarify a reason why the occupant had the opinion or feeling of approval or of rejection of the condition.

30. The information providing system according to claim 29, wherein
the input unit in the information inputting apparatus is connected to an on-vehicle device, which can be mounted on the vehicle and includes communication circuitry configured to communicate with an information providing center outside of the vehicle, so as to make communication, and supplies the intention information to the on-vehicle device according to an input operation by the occupant, and
the on-vehicle device transmits the intention information supplied according to the operation on the input unit by the occupant to the information providing apparatus.

31. The information providing system according to claim 30, wherein
the communication circuitry in the on-vehicle device is configured to transmit condition information, which is related to the condition involved with the occupant aboard the vehicle, to the information providing apparatus in association with the intention information, when the occupant inputs the information via the input unit.

32. The information providing system according to claim 30, wherein
the information inputting apparatus includes a notification unit, and wherein
the communication circuitry in the on-vehicle device is configured to acquire related information related to an input of the intention information by the occupant via the input unit from the information providing apparatus, and the notification unit notifies the occupant of the acquired related information.

33. The information providing system according to claim 32, wherein
the related information is accumulated in the circuitry in the information providing apparatus, and is based upon intention information inputted by an occupant of another vehicle for the condition when the occupant inputs the intention information via the input unit.

34. The information providing system according to claim 33, wherein
the related information is acquired from the information providing apparatus through a predetermined network service that can be used by the occupant.

35. The information providing system according to claim 29, wherein
the circuitry in the information providing apparatus is configured to present a response form encouraging the occupant of the vehicle to make a response about a reason why the intention information collected by the circuitry is supplied from the vehicle through a predetermined network service that can be used by the occupant of the vehicle, and to supplement the reason why the intention information collected by the circuitry is supplied from the vehicle based upon the response according to the response form.

* * * * *